United States Patent
Teragaki et al.

[11] Patent Number: 6,123,431
[45] Date of Patent: Sep. 26, 2000

[54] BACKLIGHT APPARATUS AND LIGHT GUIDE PLATE

[75] Inventors: Yasuko Teragaki; Katsutoshi Hibino, both of Gifu; Youichiro Goto, Hashima, all of Japan

[73] Assignee: Sanyo Electric Co., LTD, Osaka, Japan

[21] Appl. No.: 09/040,413

[22] Filed: Mar. 18, 1998

[30] Foreign Application Priority Data

Mar. 19, 1997 [JP] Japan ..................................... 9-065770
Jun. 30, 1997 [JP] Japan ..................................... 9-174862

[51] Int. Cl.⁷ ....................................................... F21V 7/04
[52] U.S. Cl. .............................................. 362/31; 362/333
[58] Field of Search ............................... 362/31, 26, 330, 362/339, 329, 333

[56] References Cited

U.S. PATENT DOCUMENTS

| | | | |
|---|---|---|---|
| 5,050,946 | 9/1991 | Hathaway | 385/33 |
| 5,442,523 | 8/1995 | Kashima | 362/31 |
| 5,572,411 | 11/1996 | Watai | 362/31 |
| 5,887,964 | 3/1999 | Higuchi | 362/31 |

FOREIGN PATENT DOCUMENTS

| | | |
|---|---|---|
| 7-20466 | 1/1995 | Japan . |
| 7-151921 | 6/1995 | Japan . |
| 7-151923 | 6/1995 | Japan . |
| 8-254615 | 10/1996 | Japan . |
| 8-254616 | 10/1996 | Japan . |

*Primary Examiner*—Sandra O'Shea
*Assistant Examiner*—Hargobind S. Sawhney
*Attorney, Agent, or Firm*—Armstrong, Westerman, Hattori, McLeland & Naughton

[57] ABSTRACT

A backlight apparatus has a light guide plate with a side surface through which the light from a light source enters The light source extends longitudinally in a specific direction. The light guide plate has a light emitting surface and a back surface opposed to the emitting surface. Horizontal grooves are formed on the back surface parallel to the longitudinal direction of the light source. A width of a flat portion defined between the grooves decreases as goes away form the light source.

31 Claims, 23 Drawing Sheets

BACKLIGHT APPARATUS AND LIGHT GUIDE PLATE

BACKGROUND OF THE INVENTION

1. Field of the Invention

This invention relates to a backlight apparatus and a light guide plate used for a liquid crystal display (LCD) and the like, and particularly to an improved backlight apparatus and light guide plate provided with an element for a better light diffusion on a front surface or a back surface.

2. Prior Art

Among popular backlight systems of these days, a main current light guide is as shown in FIG. 33.

FIG. 33 shows an exploded state of a backlight apparatus adopting a conventional light guide system.

In FIG. 33, a light guide plate 1 is made of a light guide material such as a synthetic resin. The light guide plate 1 has a light emitting surface 1a and a back surface 1b which is opposed and inclined to the emitting surface 1a. Namely, the light guide plate 1 is made of a synthetic resin such as an acrylic resin or a polycarbonate, and generally has a wedge form. A dot print is provided on the back surface 1b to heighten light emission efficiency. A light source 2 is made of a thin tube of fluorescent lamp. The light source 2 is disposed to a thicker side of the light guide plate 1. A light diffusing film 3 is made of a frosted glass color film material to further diffuse the light from the light emitting surface 1a. A lens film 4 is composed of a lower lens film 4a and an upper lens film 4b. The lens film 4 serves to give a directivity to diffused light from the diffusing plate 3.

Such backlight apparatus operates as follows. The light from the light source 2 repeats diffusing and reflecting inside the light guide plate 1, and emitted from the emitting surface 1a thereafter. The light is given a uniform luminance or irradiance by the dot print provided on the back surfaced 1b. Moreover, the lens film 4 improves the directivity of the light so that the backlight apparatus has a predetermined directivity.

The backlight apparatus described above is complicated to assemble. Moreover, such backlight apparatus is expensive because it needs many parts. Japanese Laid Open Patent Publication No. 7-20466 proposes an improved apparatus to simplify assembling work, lessen the number of parts and make the outgoing light uniform.

FIG. 34 shows a backlight apparatus shown in Japanese Laid Open Patent Publication No. 7-20466. In FIG. 34, the same reference numerals and marks indicate the elements same as or corresponding to those of the conventional apparatus of FIG. 33, and their description is omitted.

In FIG. 34, a prism array 1c is provided on the light emitting surface 1a. The prism array 1c is integrally formed as a part of the light guide plate 1. Such prism array 1c distributes the light from the emitting surface 1a in the backlight apparatus.

However, in case the prism array 1c is provided on the light emitting surface 1a, the light directivity is oriented in one direction. Then, a lens sheet is required to correct it, actually. Therefore, such art is not so effective for decreasing the number of parts.

SUMMARY OF THE INVENTION

It is an object of the invention to provide a backlight apparatus that is easily manufactured, that has a uniform outgoing light from a light emitting surface with an excellent directivity and that is low-priced, and a light guide plate realizing such backlight apparatus.

A first aspect of backlight apparatus has a light source disposed along a specific direction and a light guide plate. The light guide plate has an incident surface receiving light from the light source, a front surface crossing at right angles to the incident surface and a back surface opposed to the front surface. The front surface of the light guide plate defines a light emitting surface which emits the light entering the incident surface. The light guide plate has horizontal grooves or horizontal protrusions parallel to the specific direction, on the back surface. An interval between the horizontal grooves or horizontal protrusions decreases as goes away from the light source.

A second aspect of backlight apparatus has a light source disposed along a specific direction and a light source. The light guide plate has an incident surface receiving light from the light source, a front surface crossing at right angles to the incident surface and a back surface opposed to the front surface. The front surface of the light guide plate defines a light emitting surface which emits the light entering the incident surface. The light guide plate has horizontal grooves or horizontal protrusions parallel to the specific direction, on the light emitting surface. An interval between the horizontal grooves or horizontal protrusions decreases as goes away from the light source. The light guide plate has vertical grooves at right angles to the specific direction, the vertical grooves extending parallel to each other.

A third aspect of backlight apparatus has a light source disposed along a specific direction and a light guide plate. The light guide plate has an incident surface receiving light from the light source, a front surface crossing at right angles to the incident surface and a back surface opposed to the front surface. The front surface of the light guide plate defines a light emitting surface which emits the light entering the incident surface. The light guide plate has pyramid arrays parallel to each other, the pyramid array being formed by disposing protruded or dented pyramids in the specific direction, on the light emitting surface. An interval between the pyramid arrays decreases as goes away from the light source.

A fourth aspect of backlight apparatus has a light guide plate having an incident surface, a front surface crossing at right angles to the incident surface and defining a light emitting surface which emits the light entering the incident surface, and a back surface opposed to the front surface. A point light source is disposed opposite to a longitudinal center of the incident surface of the light guide plate. The light guide plate has grooves formed on the back surface so as to extend in a curved manner concentrically about the point light source as a center, the grooves increasing a number thereof as goes away from the point light source.

A fifth aspect of backlight apparatus has a light guide plate having an incident surface, a front surface crossing at right angles to the incident surface and defining a light emitting surface which emits the light entering the incident surface, and a back surface opposed to the front surface. A point light source is disposed opposite to a longitudinal center of the incident surface of the light guide plate. The light guide plate has grooves formed on the light emitting surface so as to extend in a curved manner concentrically about the point light source as a center, the grooves increasing a number thereof as goes away from the point light source.

A light guide plate of the invention has an incident surface receiving light from a light source, a front surface crossing at right angles to the incident surface and defining a light emitting surface which emits the light entering the incident surface, and a back surface opposed to the front surface. Grooves are formed on the light emitting surface so as to cross with each other, while increasing a number thereof as goes away from the light source.

Other objects and profits will be clear by referring to the following description with accompanying drawings showing preferred embodiments in detail.

BRIEF DESCRIPTION OF THE DRAWINGS

FIGS. 6a–6d are schematic drawings showing a light propagation in the first embodiment of backlight apparatus compared with another examples, wherein FIG. 6a shows an example having a light guide plate with a flat back surface, FIG. 6b shows an example having a light guide plate with a serrated back surface, FIG. 6c shows an example having a light guide plate with a prism array on a light emitting surface, and FIG. 6d shows the first embodiment of the invention.

DESCRIPTION OF THE PREFERRED EMBODIMENTS

Figure 1:
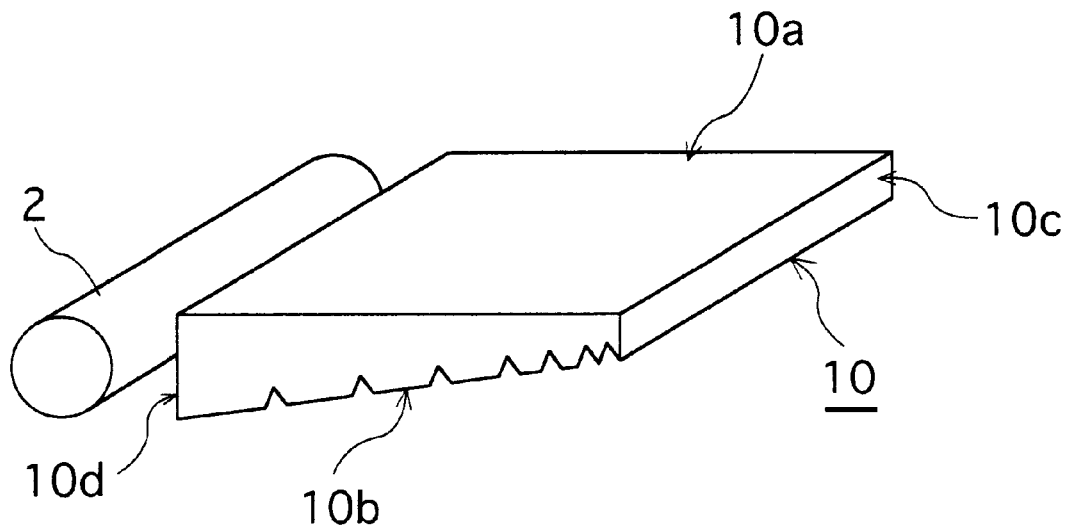
FIG. 1 is a perspective view typically showing a backlight apparatus according to a first embodiment of the invention.

Preferred embodiments of the invention is described hereafter referring to the attached drawings. In the drawings, the same reference numerals and marks show the elements same as or corresponding to those of the conventional arts. The same reference numerals and marks are appended to the same elements throughout the following embodiments to omit their description.

Figure 2:
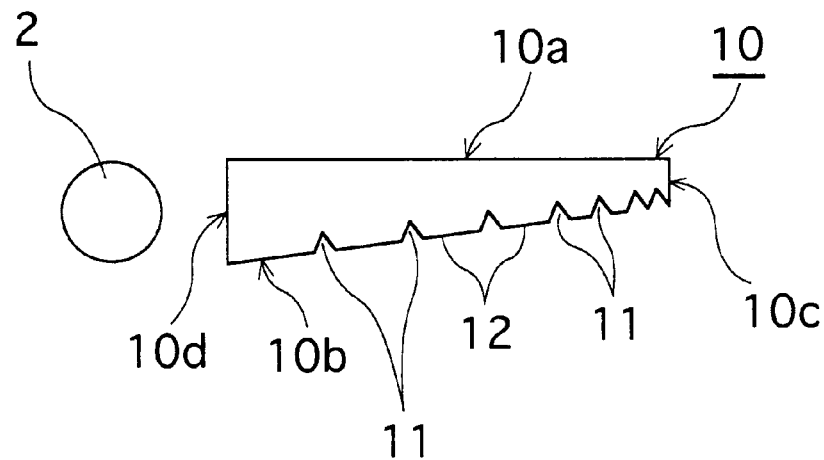
FIG. 2 is a front view typically showing the first embodiment of backlight apparatus.

FIGS. 1 and 2 typically show a first embodiment of backlight apparatus of the invention.

In FIGS. 1 and 2, a light guide plate 10 is made of a light transmitting synthetic resin such as an acrylic resin, polycarbonate and the like. As the light guide plate 10 of this embodiment, a wedge type is used with a planar dimension of 260 mm wide and 190 mm deep (260 mm wide and 190 mm high in its upright position). The thickness is 1.2 mm at a thinner end 10c and 3.0 mm at a thicker end 10d. Of course, the size of the light guide plate 10 is not limited to the above in practicing the invention. The light guide plate 10 has a flat front surface defining a light emitting surface 10a which is perpendicular to the thicker end 10d. The end 10d is disposed opposite to the light source 2 and constitutes a light incident surface for entering light.

A back surface 10b of the light guide plate 10 is opposite and inclined to the light emitting surface 10a. Many horizontal grooves 11 are provided discontinuously on the back surface 10b so as to be parallel to the light source 2. Namely, each horizontal groove 11 has a triangular cross-section and extends linearly in the width direction of the light guide plate 10. The horizontal grooves 11 are disposed parallel to each other with intervals in the depth (height) direction of the guide plate 10. The interval between the adjacent grooves 11 is set smaller as goes away from the light source 2 or the end 10d. At last, the grooves 11 are continuously arranged near the end 10c so that the interval therebetween is zero.

Figure 3:
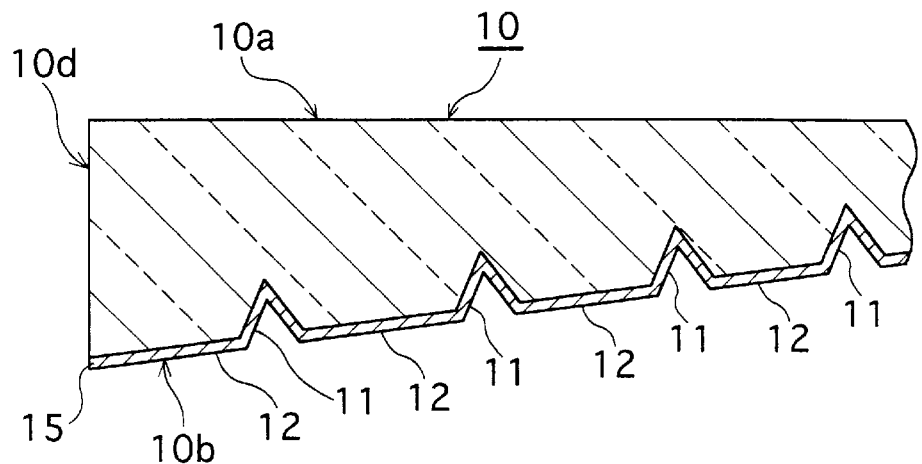
FIG. 3 is a partial sectional view typically showing the first embodiment of backlight apparatus.
Figure 4:
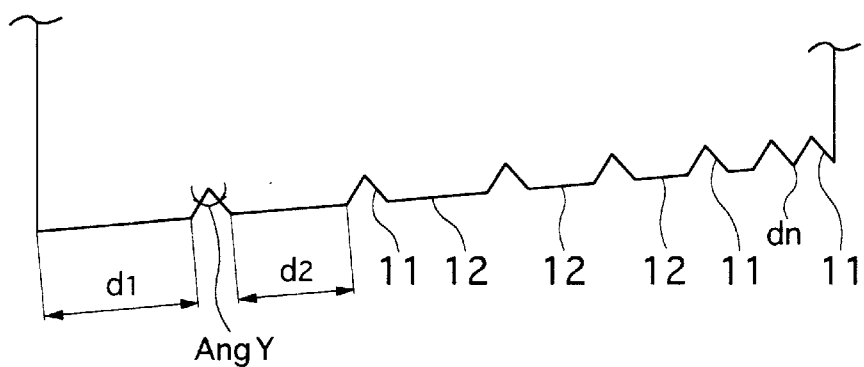
FIG. 4 is an explanatory drawing showing a back surface structure of a light guide plate according to the first embodiment.
Figure 5:
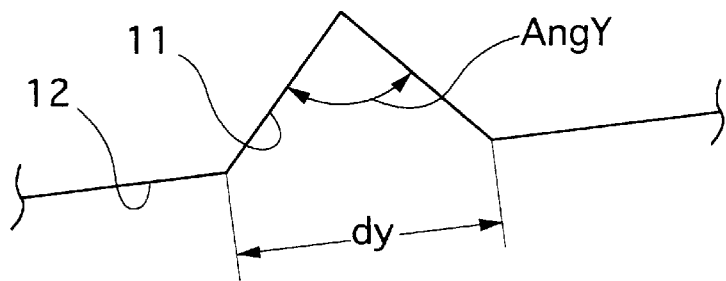
FIG. 5 is an explanatory drawing showing a horizontal groove structure of the light guide plate according to the first embodiment.

FIGS. 3 to 5 show the structure of the back surface 10c of the light guide plate 10 in detail.

Referring to FIG. 3, flat portions 12 are formed between the end 10d and the first horizontal groove 11 and between the adjacent grooves 11, respectively. The flat portion 12 has an oblong shape extending in the width direction of the guide plate 10. A width of the flat portion 12 is largest at the thicker end 10d and become smaller gradually as goes toward the thinner end 10c. At last, any flat portion 12 is not formed between the grooves 11 near the end 10c.

Referring to FIGS. 4 and 5, each horizontal groove 11 has a cross-section of isosceles triangle that has a base width dy of 50 μm and an apex angle AngY of 150°. The first flat portion 12 nearest the end 10d has a width d1 of 0.5 mm. The widths d2–dn of the following flat portions 12 become smaller constantly by a fixed value, for example 0.7 μm, as goes away from the light source 2. Near the opposite end 10c, the horizontal grooves 11 are successive so that the width dn therebetween is zero.

The above mentioned light guide plate 10 is manufactured by injection molding so as to form the horizontal grooves 11 integrally on the back surface 10b. Moreover, a reflecting film 15 of aluminum is coated on the back surface 10b by sputtering or vapor deposition. The reflecting film 15 has a thickness of 200–1000 Å. The reflecting film 15 heightens reflecting efficiency of the back surface 10b and prevents the light from leaking from the back surface 10b, thereby to improve output efficiency of the outgoing light L from the emitting surface 10a.

Light propagation of the first embodiment of backlight apparatus is described hereafter in comparison with other examples, referring to FIGS. 6a–6d.

Figure 6A:
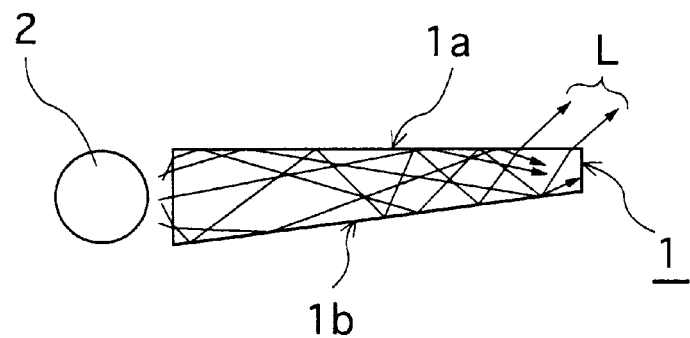
Figure 6B:
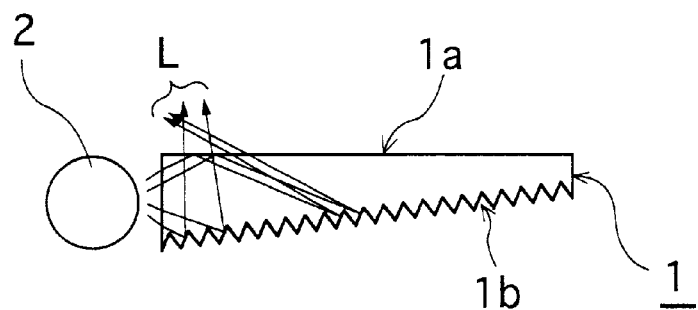
Figure 6C:
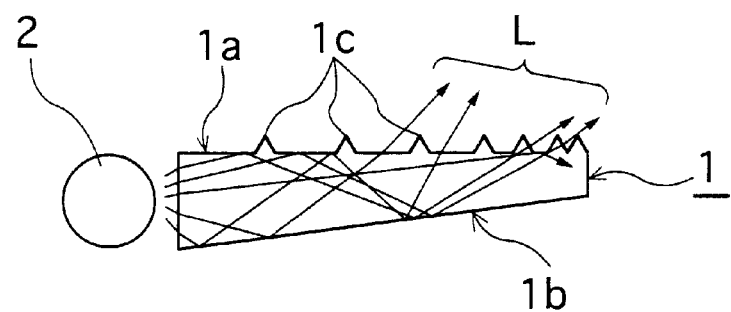
Figure 6D:
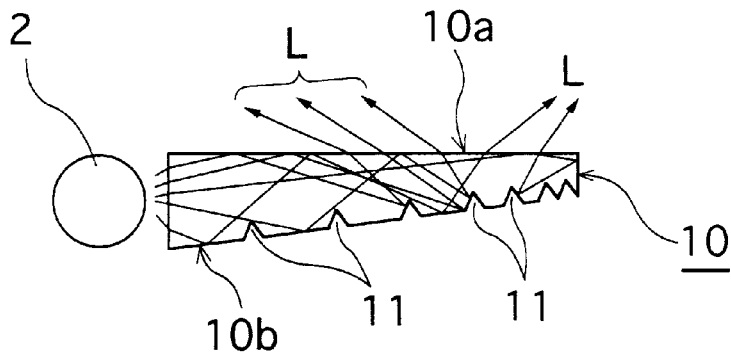

FIG. 6a shows a light guide plate with a flat back surface. FIG. 6b shows a light guide plate with a serrated back surface. FIG. 6c shows a light guide plate having a prism array provided on a light emitting surface. FIG. 6d shows the first embodiment of the invention.

Figure 31:
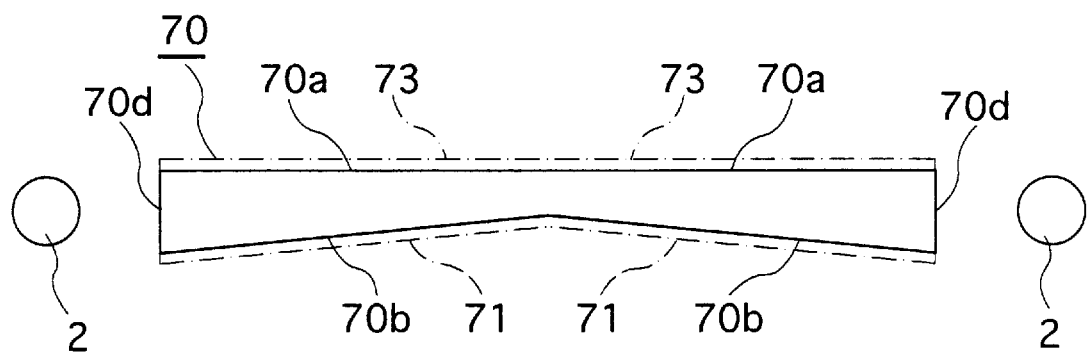
FIG. 31 is an explanatory drawing typically showing an eighth embodiment of backlight apparatus of the invention.

FIG. 6a corresponds to the prior art of FIG. 31. The entire back surface 1b of the light guide plate 1a is flat. An aluminum reflecting film is formed on the back surface 1b though not shown. In this example, most incident light from the light source 2 is totally reflected inside the guide plate 1. Then, the light goes out near the end opposite to the light source 2 as an outgoing light L. Therefore, the outgoing light L is not uniform over the whole emitting surface 1a.

In FIG. 6b, the light emitting surface 10a of the light guide plate 1 is flat, while the back surface 1b is zigzagged or serrated. An aluminum reflecting film is formed on the back surface 1b though not shown. In this example, most incident light from the light source 2 reflects at the serrated surface near the light source 2, thereby becoming an outgoing light L going out near the light source 2. Therefore, the outgoing light L is not uniform over the whole emitting surface 1a.

Figure 32:
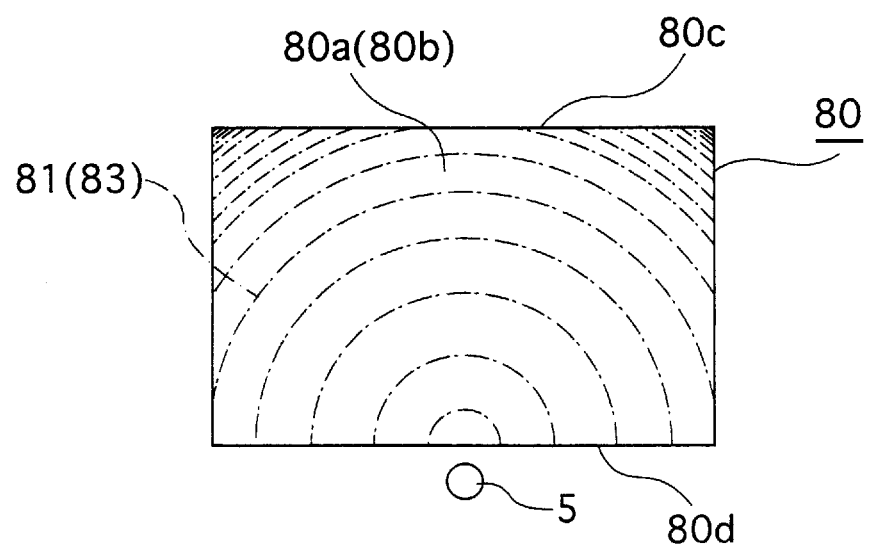
FIG. 32 is a explanatory drawing typically showing a ninth embodiment of backlight apparatus of the invention.
Figure 33:
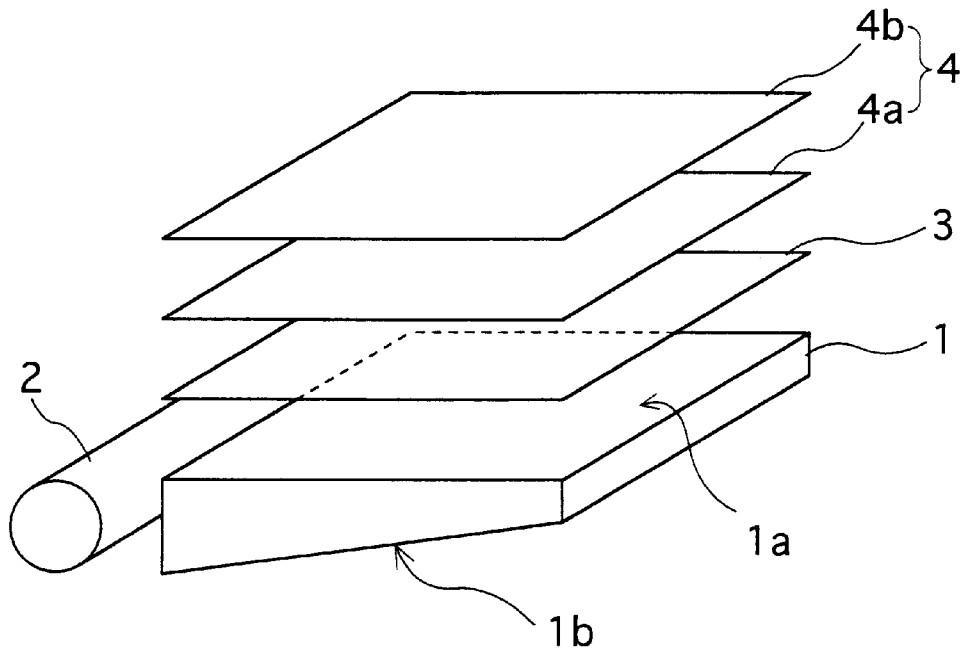
FIG. 33 is an explanatory drawing showing an exploded state of a backlight apparatus adopting a conventional light guide system.
Figure 34:
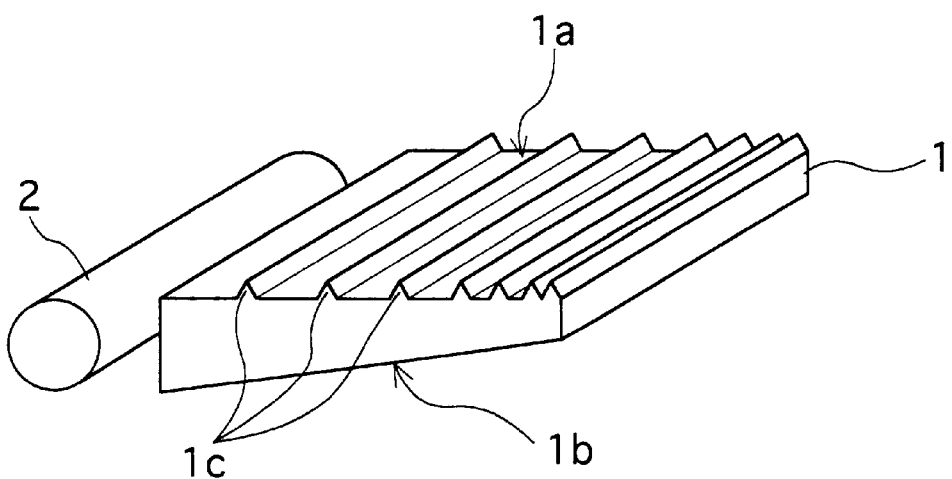
FIG. 34 is an explanatory drawing showing a backlight apparatus disclosed in Japanese Laid Open Patent Publication No. 7-20466.

FIG. 6c corresponds to the prior art of FIG. 32. The light guide plate 1 has the prism array 1c formed on the light emitting surface 1a, while the back surface 1b is made flat. An aluminum reflecting film is formed on the back surface 1b though not shown. The prism array 1c is composed of many prisms disposed discontinuously on the emitting surface 1a. In this example, all the outgoing light L is emitted in a fixed direction away from the light source 2 while inclined to the emitting surface 1a, whether emitted from the prism or from a flat portion between the prisms. Therefore, a lens is necessary to correct the outgoing direction of the light if used as a backlight apparatus.

FIG. 6d shows the present embodiment of the invention. In this embodiment, most incident light is totally reflected at the flat portions 12 (other portions than the horizontal grooves 11) when transmitted inside the light guide plate 10. Thus, the light moves toward the end 10c in a direction away from the light source 2. On the other hand, the light is reflected at the grooves 11 toward the emitting surface 10a, thereby going out from the light guide plate 10. Therefore, it is possible to obtain a uniform outgoing light L all over the emitting surface 10a. The outgoing direction of such light L is not orientated as in the prior art. Thus, it is unnecessary to provide a lens to correct the outgoing light direction, if the shape and dimension of the groove 11 or the interval between them (width of the flat portion 12) is adjusted.

Figure 7:
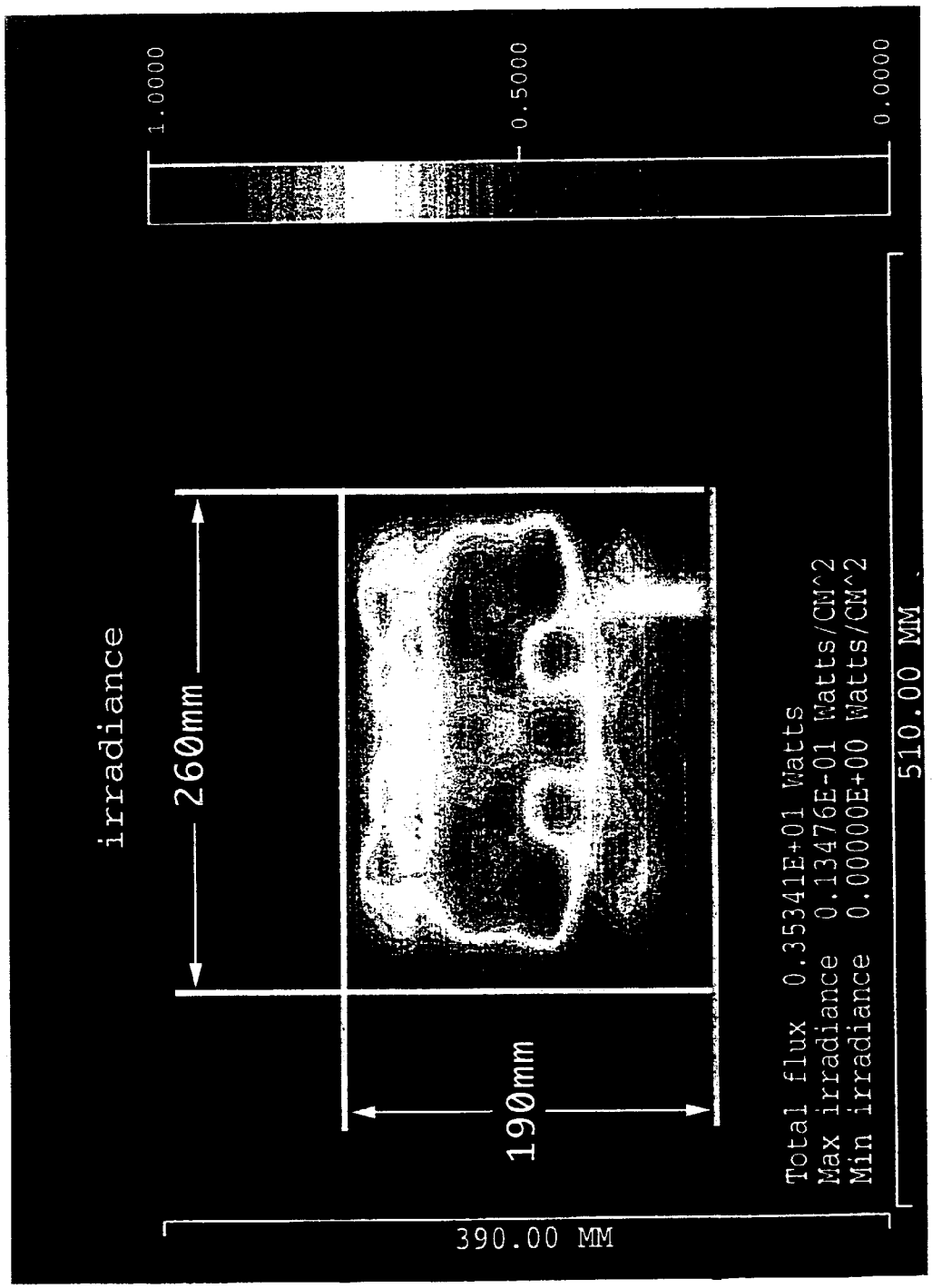
FIG. 7 is an explanatory drawing showing a ray tracing simulation result of the first embodiment of backlight apparatus.
Figure 35:
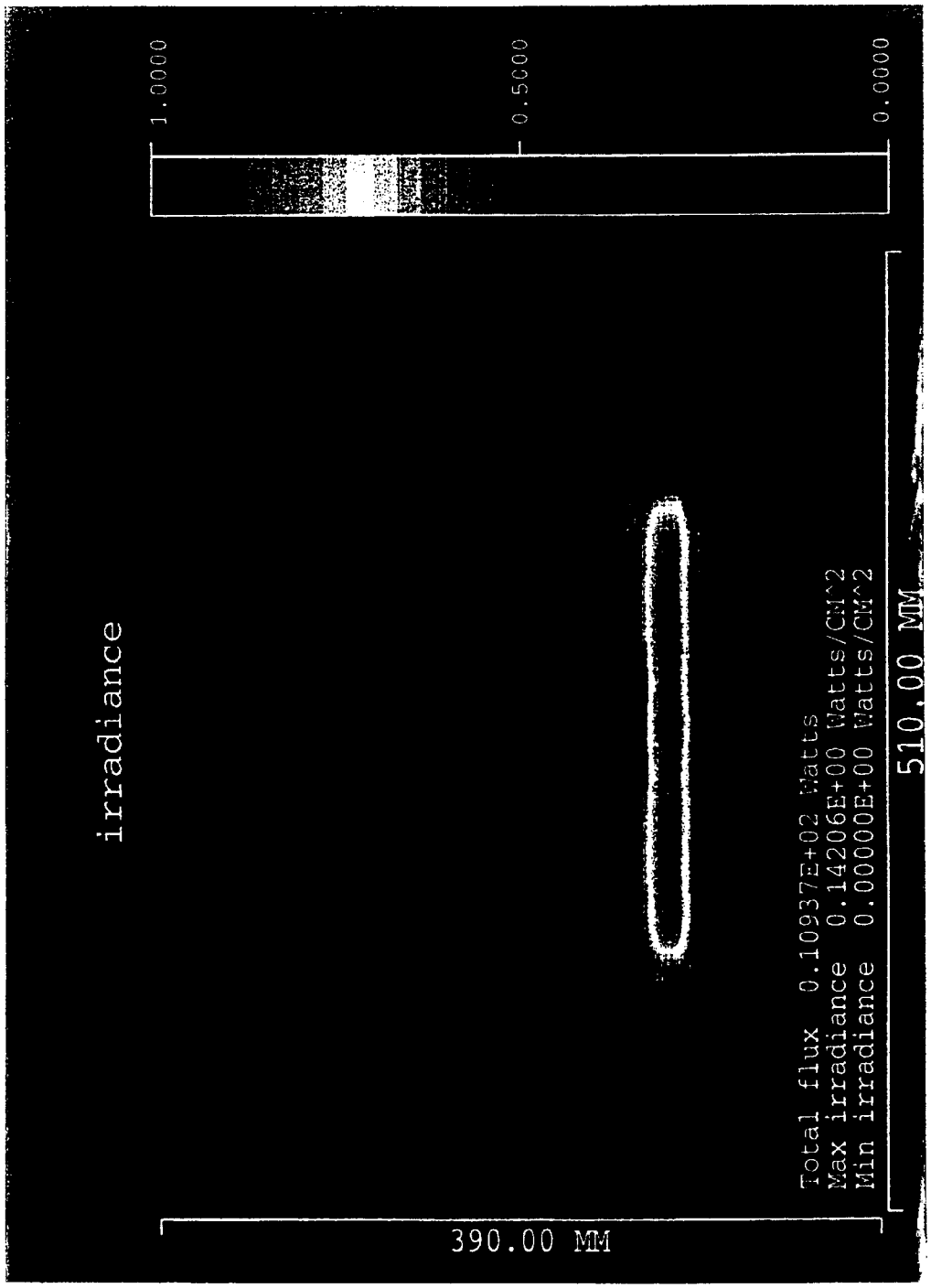
FIG. 35 is an explanatory drawing showing a ray tracing simulation result of a conventional backlight apparatus which has a serrated back surface.

FIG. 7 shows a ray tracing simulation result of the backlight apparatus according to the first embodiment. FIG. 35 shows a ray tracing simulation result of the backlight apparatus as a comparison example corresponding to FIG. 6b which has the light guide plate with the serrated back surface.

For the simulation, the wedge type is used as the first embodiment of light guide plate 10. The light guide plate 10 is made of an acrylic resin with a refractive index of 1.49 and has above mentioned size (260 mm wide, 190 mm deep, 1.2 mm thick at thinner end 10c and 3 mm thick at thicker end 10d). The wedge type of similar size is used as the comparison example of light guide plate.

Particularly, the horizontal grooves 11 of the present embodiment has the above structure (dy=50 μm, AngY=150°, d1=0.5 mm). The width of the flat portions 12 between the grooves 11 decreases constantly by 0.7 μm as goes away from the light source 2. On the other hand, the comparison example of light guide plate has the serrated back surface 1b made of continuous grooves of a triangular cross-section, which has a base width of 50 μm and an apex angle of 150°. In either case, the light source 2 is disposed below the guide plate in the upright position in use (below the end 10d or 1d).

Comparing the ray tracing result in the emitting surface 10a (FIG. 7) and that of the emitting surface 1a (FIG. 35), it is obvious that an irradiance distribution in the present embodiment is wider than that of the comparison example of FIG. 35. Especially, most light goes out from the emitting surface 1a near the light source 2 in the comparison example. However, the irradiance distribution is uniform all over the emitting surface 10a in the present embodiment of light guide plate 10.

Figure 8:
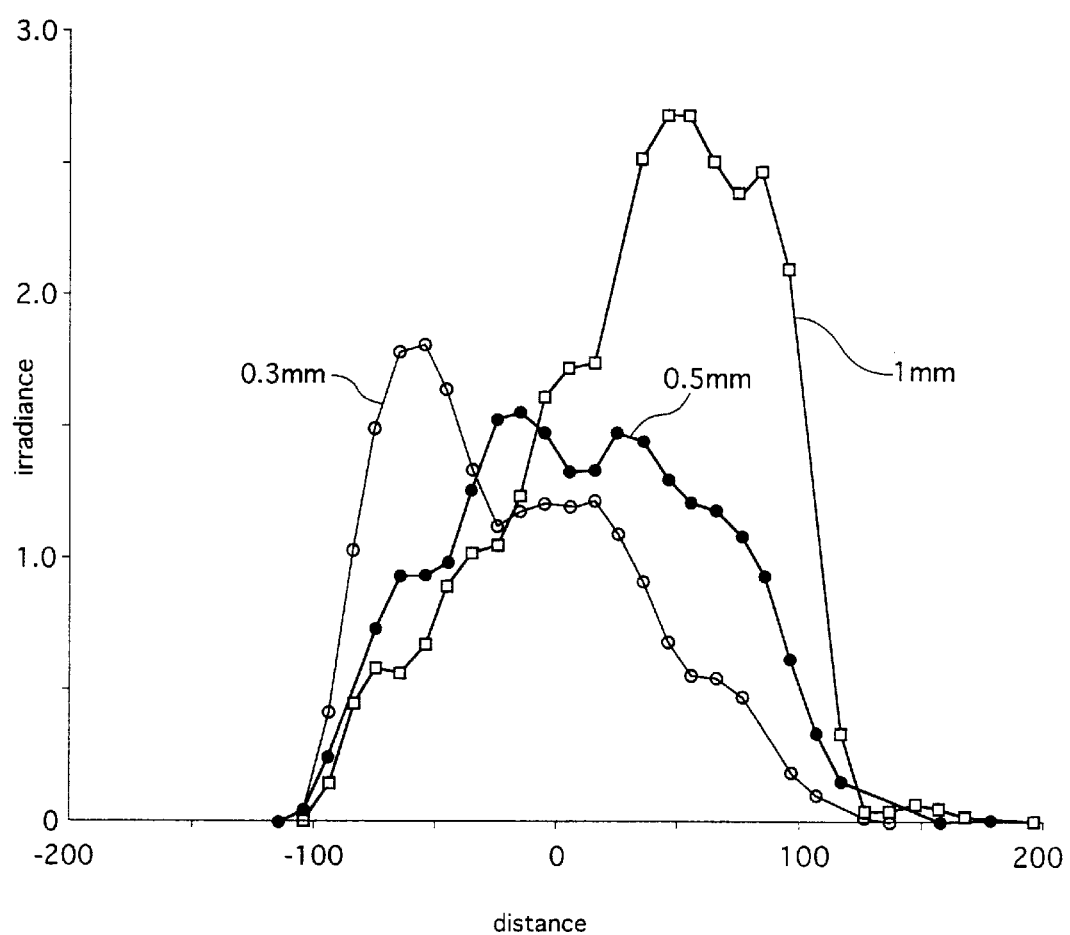
FIG. 8 is a graph showing a irradiance distribution of a first example of the first embodiment of backlight apparatus which has a width of a first flat portion of the light guide plate changed.

FIG. 8 shows an irradiance distribution in a first example of the first embodiment of backlight apparatus.

FIG. 8 illustrates a simulation result of an outgoing light amount in case of changing only the width d1 of the first flat portion 12 in the light guide plate 10. Namely, the apex angle is AngY=150° and the base width is dy=0.05 mm. The widths d1–dn of the flat portions 12 becomes smaller constantly by a fixed value as goes away from the light source 2. The width is dn=0 at the opposite end so that grooves 11 are continuous. If the first width d1 is 0.3 mm or 1 mm, the outgoing light amount or irradiance may be large at a position of the emitting surface 10a near or far from the light source 2. However, the light intensity is strong at the center and the irradiance distribution is largely improved. Particularly, it is understood that, if the first width d1 is about 0.5 mm, the irradiance distribution is most uniform.

Figure 9:
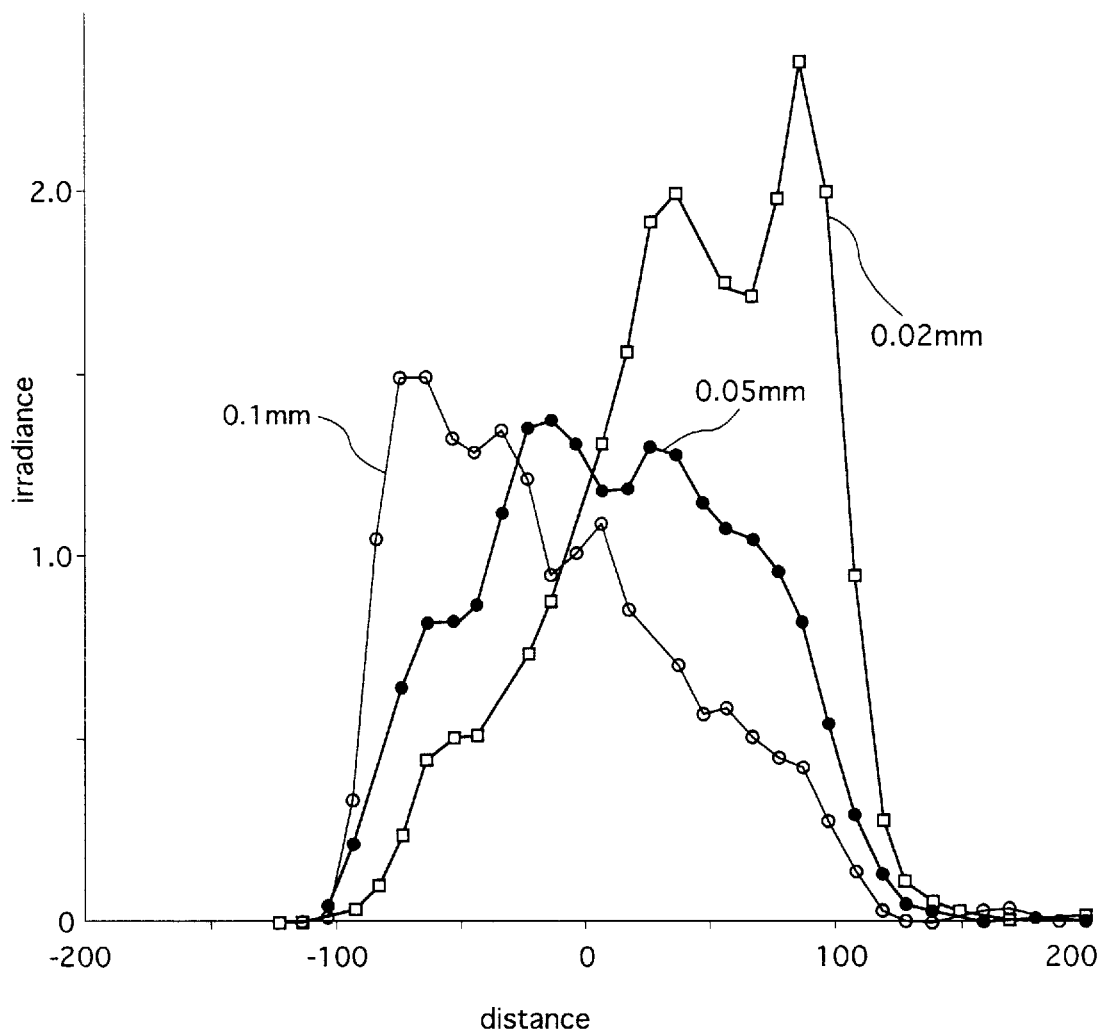
FIG. 9 is a graph showing a irradiance distribution of a second example of the first embodiment of backlight apparatus which has a base width of the horizontal groove of the light guide plate changed.

FIG. 9 shows an irradiance distribution in a second example of the first embodiment of backlight apparatus.

FIG. 9 illustrates a simulation result of an outgoing light amount in case of changing only the base width dy of the horizontal groove 11 in the guide plate 10. Namely, the apex angle is AngY=150° and the width of the first flat portion 12 is d1=0.5 mm. The widths d1–dn of the flat portions 12 becomes smaller constantly by a fixed value as goes away from the light source 2. The width is dn=0 at the opposite end so that grooves 11 are continuous. If the base width dy is 0.02 mm or 0.1 mm, the irradiance may be large at a position of the emitting surface 10a near or far from the light source 2. However, the light intensity is strong at the center and the irradiance distribution is largely improved. Particularly, it is understood that, if the base width dy is about 0.05 mm, the irradiance distribution is most uniform.

Figure 10:
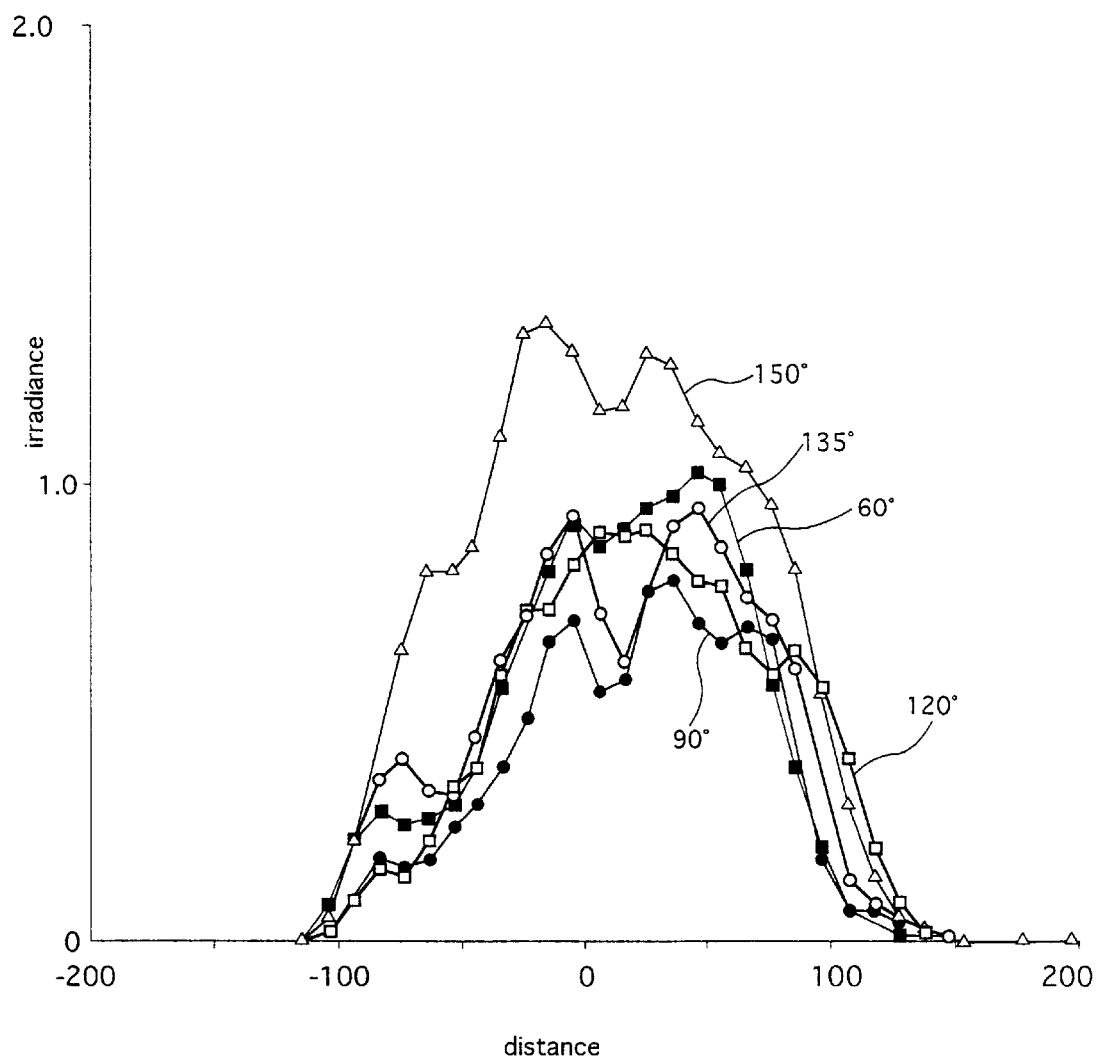
FIG. 10 is a graph showing a irradiance distribution of a third example of the first embodiment of backlight apparatus which has an apex angle of the horizontal groove of the light guide plate changed.

FIG. 10 shows an irradiance distribution in a third example of the first embodiment of backlight apparatus.

FIG. 10 illustrates a simulation result of an outgoing light amount in case of changing only the apex angle AngY of the horizontal groove 11 in the guide plate 10. Namely, the base width is dy=0.05 mm and the width of the first flat portion 12 is d1=0.5 mm. The widths d1–dn of the flat portions 12 becomes smaller constantly by a fixed value as goes away from the light source 2. The width is dn=0 at the opposite end so that grooves 11 are continuous.

If the apex angle AngY is in the range of 60° to 150°, the light intensity is strong at the center and the irradiance distribution is uniform. Thus, the irradiance distribution is largely improved. Particularly, if the apex angle AngY is about 150°, the irradiance greatly increases and the irradiance distribution clearly gets better.

Figure 11:
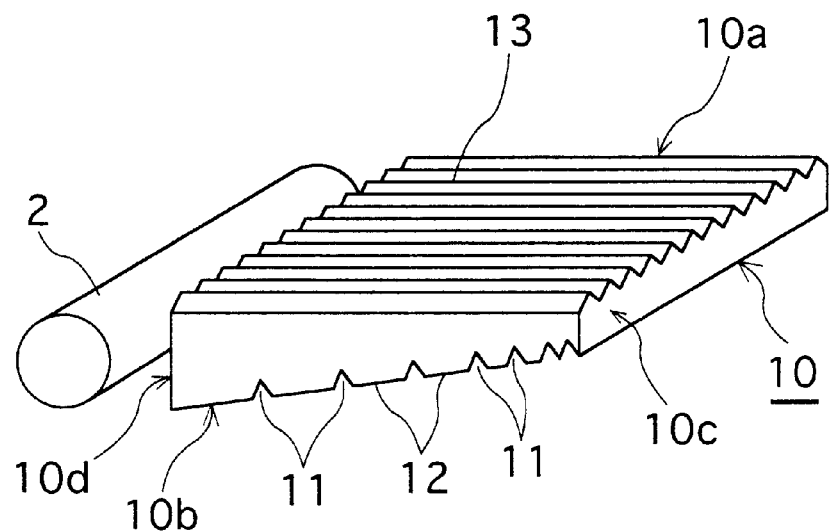
FIG. 11 is a perspective view typically showing a backlight apparatus according to a second embodiment of the invention.
Figure 12:
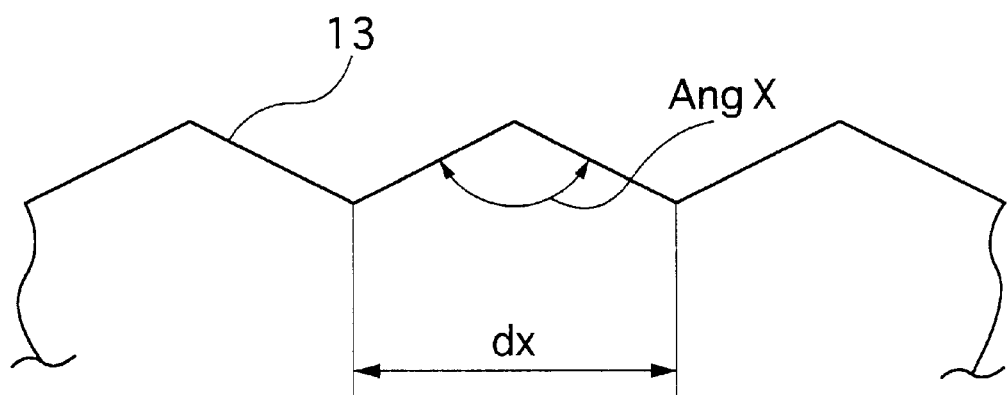
FIG. 12 is an explanatory drawing showing a vertical groove structure of the light guide plate according to the second embodiment.

FIG. 11 typically shows a second embodiment of backlight apparatus. FIG. 12 shows a structure of a vertical groove of a light emitting surface of a light guide plate according to the second embodiment.

Referring to FIG. 11, a light guide plate 10 of the second embodiment additionally has a zigzag surface 13 on the emitting surface 10a of the light guide plate 10 of the first embodiment. Other constitution is the same as the first embodiment. Namely, a serrated surface or zigzag surface 13 is defined by many vertical grooves which are continuously formed on the emitting surface 10a. Each vertical groove has a triangular cross-section and extends in a direction perpendicular to the longitudinal direction of the light source 2 (depth or height direction of the guide plate 10).

Referring to FIG. 12, each vertical groove of the zigzag surface 13 has the same shape and size as the horizontal groove 11. Namely, each vertical groove has a cross-section of isosceles triangle which has a base width dx of 50μ and apex angle AngX of 150°. The guide plate 10 of such shape is manufactured by injection molding to form the zigzag surface 13 integrally on the emitting surface 10a. The zigzag surface 13 heightens the light emitting efficiency more.

Figure 13:
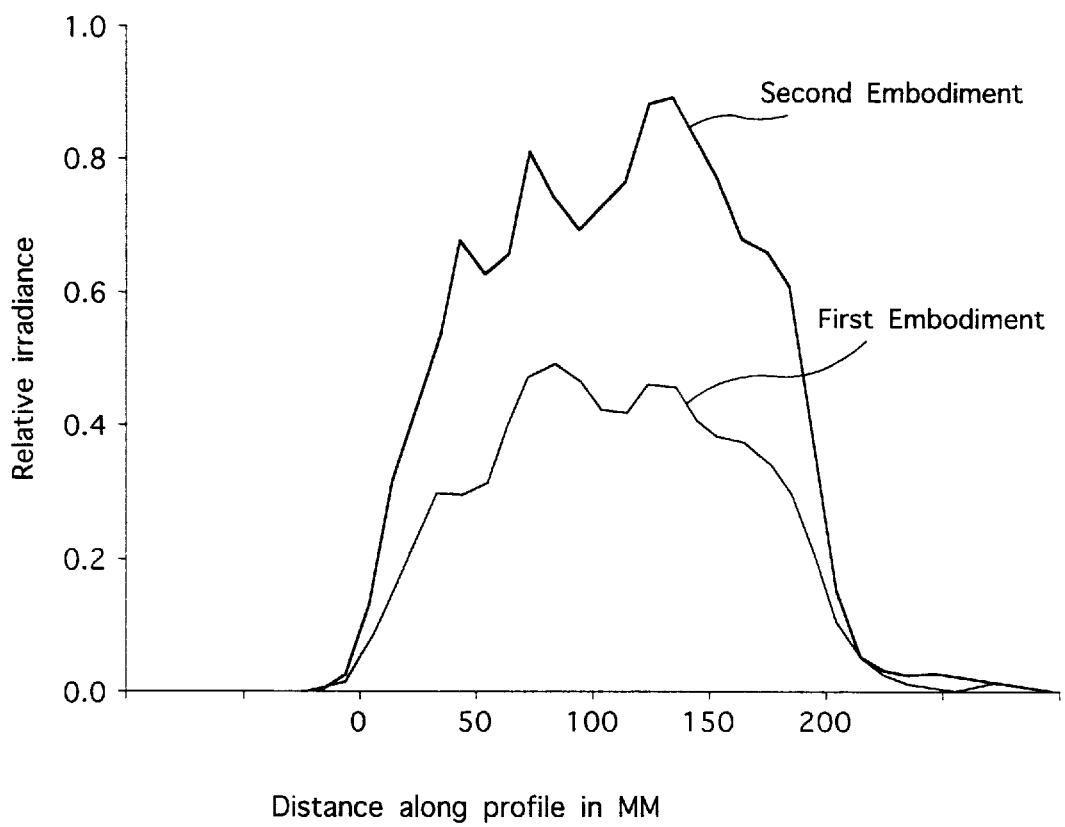
FIG. 13 is a graph showing a simulation result of an irradiance distribution at a center part of the light guide plate in the second embodiment of backlight apparatus, while compared with the first embodiment.

FIG. 13 shows a simulation result of an irradiance distribution at the center of the light guide plate in the second embodiment, compared with the case in the first embodiment.

In both simulations of the first and second embodiments, the apex angle of the horizontal groove 11 is AngY=150°, the width of the first flat portion 12 is d1=0.5 mm and the base width is dy=0.05 mm. FIG. 13 shows the simulation result in such case, while indicating a distance from the light source 2 and a relative irradiance.

Comparing the first and second embodiments, it is understood that, if the zigzag surface 13 is formed continuously on the emitting surface 10a as in the second embodiment, the light emitting efficiency is more improved. Moreover, it is possible to set the directivity of the outgoing light from the emitting surface 10a as desired, if the structure of the zigzag surface 13 is changed.

Figure 14:
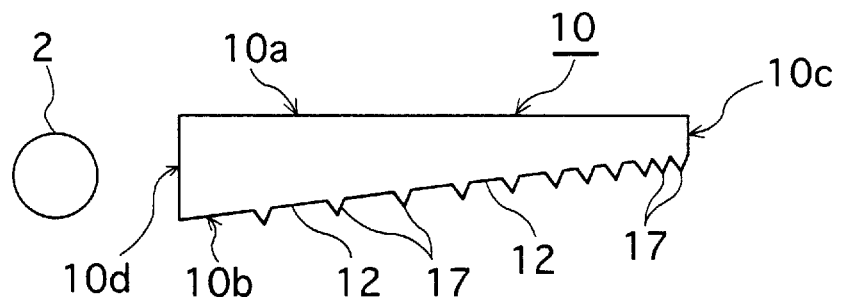
FIG. 14 is a front view typically showing a backlight apparatus according to a third embodiment of the invention.

FIG. 14 typically shows a third embodiment of backlight apparatus of the invention.

In the third embodiment, many prisms 17 are formed on the back surface 10b of the light guide plate 10 in place of the horizontal grooves 11. Other constitution is the same as the first embodiment. Namely, the prisms 17 are provided discontinuously on the back surface 10b so as to be parallel to the light source 2. Each prism 17 has a triangular cross-section and extends linearly in the width direction of the light guide plate 10. The prisms 17 are disposed parallel to each other with intervals in the depth direction of the light guide plate 10. The arrangement of the prisms 17 is the same as the arrangement of the horizontal grooves 11. The prisms 17 are continuously arranged near the end 10c at last. Each prism 17 may have a cross-section of isosceles triangle and its base width, apex angle may be the same as those of the horizontal groove 11. The width of the flat surface 12 is also the same as that of the first embodiment. The guide plate 10 of such structure is manufactured by injection molding and forms the prisms 17 integrally on the back surface 10b. The back surface 15 has the reflecting film 15, too.

Here, in the first to third embodiments, the plate 10 may be formed into the wedge shape of about 260 mm wide, about 190 mm deep, about 3 mm thick at the incident surface and about 1.2 mm thick at the opposite surface to the incident surface. Moreover, the first interval between the horizontal grooves 11 or prisms 17, which is nearest the incident surface, may be set approximately in the range of 0.3 mm–1 mm.

The above embodiments have the following effects due to the discontinuous grooves 11 or prisms 17 provided on the back surface 10b of the light guide plate 10. Namely, when the light is transmitted inside the light guide plate 10, most light is totally reflected at the portions other than the grooves 11 or prisms 17, i.e. at the flat portions 12. Then, the light advances in the direction away from the light source 2. On the other hand, the light advances toward the emitting surface at the grooves 11 or prisms 17, thereby going out from the light guide plate 10. Thus, the outgoing light L is uniform. Moreover, in case of disposing the grooves 11 or prisms 17 not on the emitting surface 10a but on the back surface 10b, part of the outgoing light L moves in the direction away from the light source 2 while another part of the light L moves toward the light source 2. Therefore, the directivity is improved, too.

In each above embodiment, the irradiance or luminance distribution becomes uniform on the emitting surface 10a, by adjusting arrangement of either the groove 11 or flat portion 12. Moreover, the light guide plate 10 can be formed by the injection molding and its manufacturing is easy. Furthermore, the outgoing light L is uniform all over the emitting surface 10a, the directivity is excellent, and its price becomes low.

While the cross-section of the horizontal groove 11 or prism 17 is an isosceles triangle in the above embodiments, its shape is not limited thereto, since the dimension thereof is not so large(micron order) relative to the thickness of the guide plate 10. The cross-section of the groove 11 or prism 17 may be a scalene triangle, a right-angled triangle or others than the isosceles triangle. It may be a shape other than the triangle, e.g. a trapezoid, semicircle, semi-ellipse, etc. Still, if the groove 11 or prism 17 has an isosceles triangle cross-section, it can direct the reflected light coming from other than the light source 2 toward the emitting surface 10a. Moreover, die releasing is easy in the injection molding in case of the isosceles triangle cross-section.

Similarly, in the second embodiment, the cross-section of the vertical groove of the zigzag surface 13 may be another form than the isosceles triangle, such as a desired polygon or embossed shape. Still, if the vertical groove cross-section is isosceles triangle which has an apex angle in the range of 90° to 170°, it is possible to give a appropriate directivity to an LCD while heightening the outgoing light efficiency.

The inventors verified that the invention could be practiced by making the apex angle of the isosceles triangle of the groove 11 into the range of 30° to 170° so as to perform the above advantageous effects. Moreover, the inventors also verified that, if the base width of the isosceles triangle is in the range of 0.02 mm to 0.1 mm, the invention could be concretized into a backlight apparatus for LCD for personal computers.

While the horizontal grooves 11 or prisms 17 are formed on the back surface 10b of the light guide plate 10, the total thickness of the light guide plate can be smaller in case of forming the grooves 11.

Figure 15:
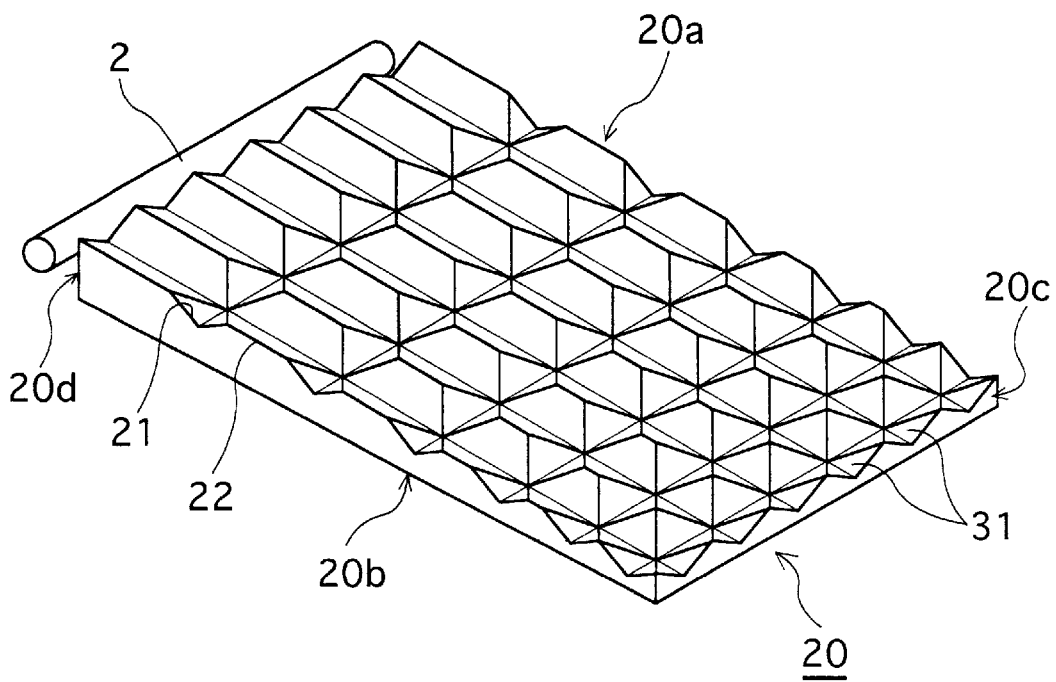
FIG. 15 is a perspective view typically showing a backlight apparatus according to a fourth embodiment the invention.
Figure 16:
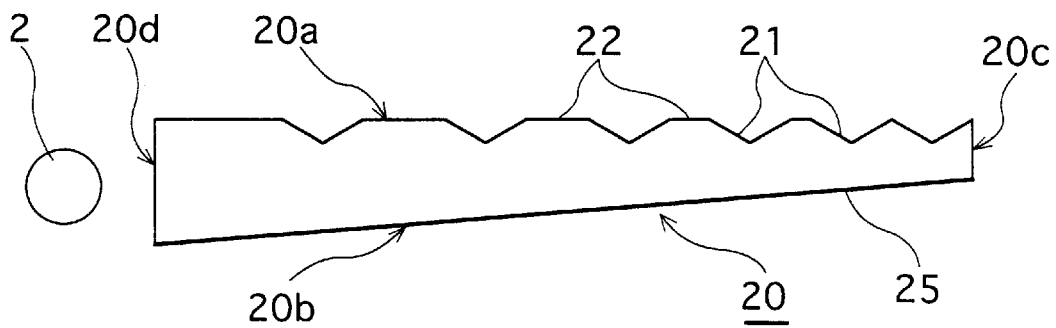
FIG. 16 is a front view typically showing the fourth embodiment of backlight apparatus.
Figure 17:
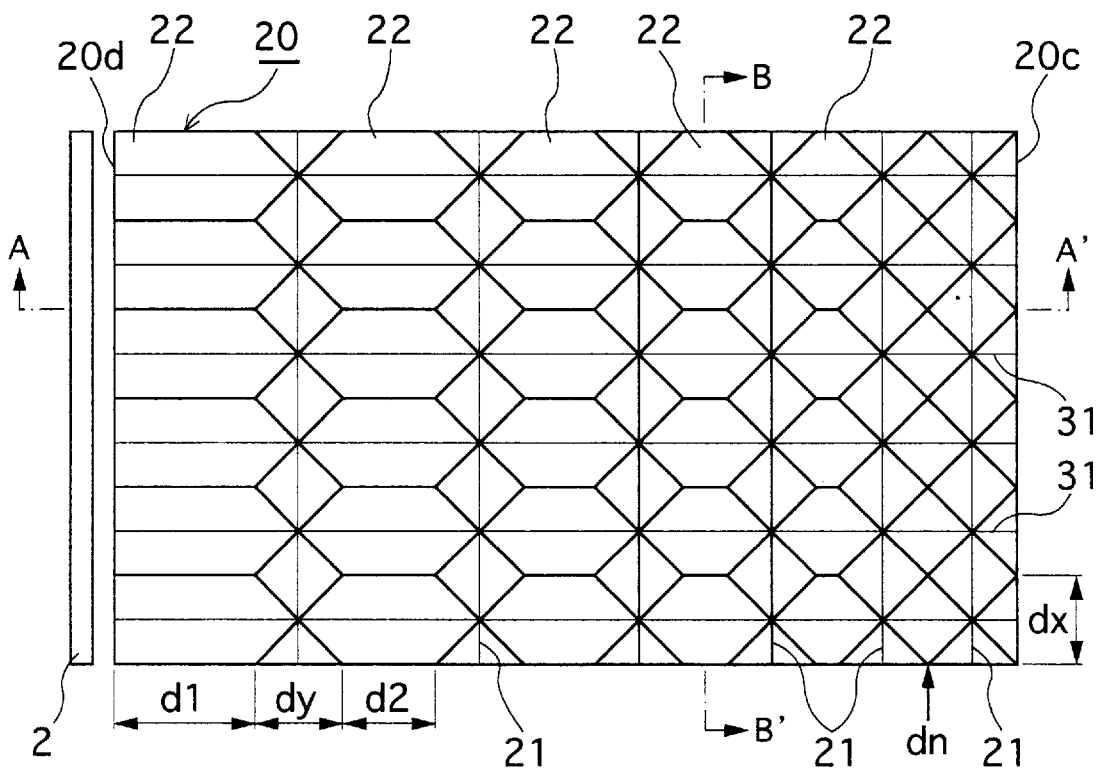
FIG. 17 is a plan view typically showing the fourth embodiment of backlight apparatus.
Figure 18:
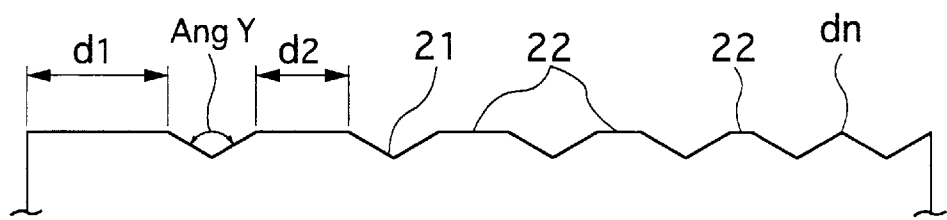
FIG. 18 is a cross-sectional view taken along the line A–A' of FIG. 17.
Figure 19:
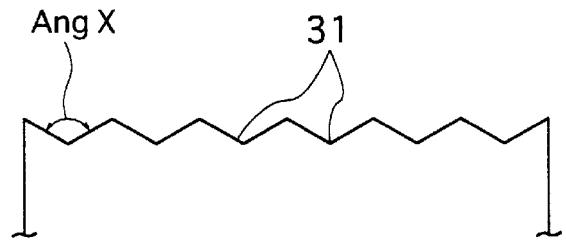
FIG. 19 is a cross-sectional view taken along the line B–B' of FIG. 17.

FIGS. 15–17 typically show a fourth embodiment of backlight apparatus of the invention. FIG. 18 is a cross sectional view taken along the line A–A' of FIG. 17. FIG. 19 is a cross sectional view taken along the line B–B' of FIG. 17.

Referring to FIGS. 15 and 16, the light guide plate 20 of this embodiment is made of the same light transmitting synthetic resin as that of the light guide plate 10 of the first embodiment. It has the same wedge shape. Though the size of the light guide plate 20 is not limited, it may be the same as that of the first embodiment. The light guide plate 20 has a light emitting surface 20a perpendicular to an end 20d. The guide plate 20 has a flat back surface 20b which is opposed and inclined to the emitting surface 20a.

Many horizontal grooves 21 are provided discontinuously on the emitting surface 20a so as to be parallel to the light source 2. Namely, each horizontal groove 21 has a triangular cross-section and extends linearly in the width direction of the light guide plate 20. The horizontal grooves 21 are disposed parallel to each other with intervals in the depth (height) direction of the guide plate 20. The interval between the adjacent grooves 21 is set smaller as goes away from the light source 2 or the end 20d. At last, the grooves 21 are continuously arranged near the end 20c so that the interval therebetween is zero.

Flat portions 22 are formed between the end 20d and the first horizontal groove 21 and between the adjacent grooves 21, respectively. The flat portion 22 has an oblong shape extending in the width direction of the guide plate 20. A width of each flat portion 22 (length in the depth direction of the guide plate 20) is largest at the thicker end 20d and become smaller gradually as goes toward the thinner end 20c. At last, any flat portion 22 is not formed between the grooves 21 near the end 20c.

Referring to FIGS. 17 and 18, each horizontal groove 21 has a cross-section of isosceles triangle that has a base width of dy=50 μm and an apex angle of AngY=120°. The first flat portion 22 has a width of d1=0.5 mm. The widths d2–dn of the following flat portions 22 become smaller constantly by a fixed value, as in the first embodiment, as goes away from the light source 2. Near the opposite end 20c, the horizontal grooves 21 are successive so that the width therebetween is dn=0. The position where dn=0 may be a position very near the end 20c or around a position located inward from the end 20c approximately by ⅕ to ⅒ of the depth of the guide plate 20.

Moreover, as shown in FIG. 19, many vertical grooves 31 are formed on the emitting surface 20a of the guide plate 20 at right angles to the horizontal grooves 21 and light source 2. In detail, many vertical grooves 31 of triangular cross-section are continuously formed so as to be parallel to each other and extend in the depth direction of the guide plate 20. Thus, a serrated or zigzag surface is defined on the emitting surface 20a. Thereby, many prisms of substantially pyramid shapes are formed between the horizontal grooves 21 and the vertical grooves 31. The prism corresponds to a flat portion while a length of the prism corresponds to a width of the flat portion. The length of the prism becomes smaller as goes away from the light source 2.

Each vertical groove 31 has a cross-section of isosceles triangle that has a base width of dx=50 μm and an apex angle of AngX=120°. Such light guide plate 20 is manufactured by injection molding so as to form the horizontal grooves 21 and vertical grooves 31 integrally on the emitting surface 20a. Moreover, a reflecting film 25 similar to the reflecting film 15 of the first embodiment is coated on the back surface 20b.

The light is totally reflected at the back surface 20b when propagated inside the light guide plate 20, and advances away from the light source 2. On the other hand, the light is refracted at the horizontal groove 21 and the vertical grooves 31 toward the emitting surface 20a, thereby outgoing from the emitting surface of the guide plate 20. Thus, the outgoing light is uniform all over the emitting surface 20a. Such outgoing light is diffused at the horizontal grooves 21 and vertical grooves 31, and is not oriented in a specific direction.

Moreover, the vertical grooves 31 improves the light output efficiency. If the light source 2 is a discharge lamp or the like which has an uneven light quantity along the length, density of the vertical grooves 31 may be changed in accordance with a position or brightness of the light source 2. Thus, the entire emitting surface 20a can be lit substantially at an even brightness.

Figure 20:
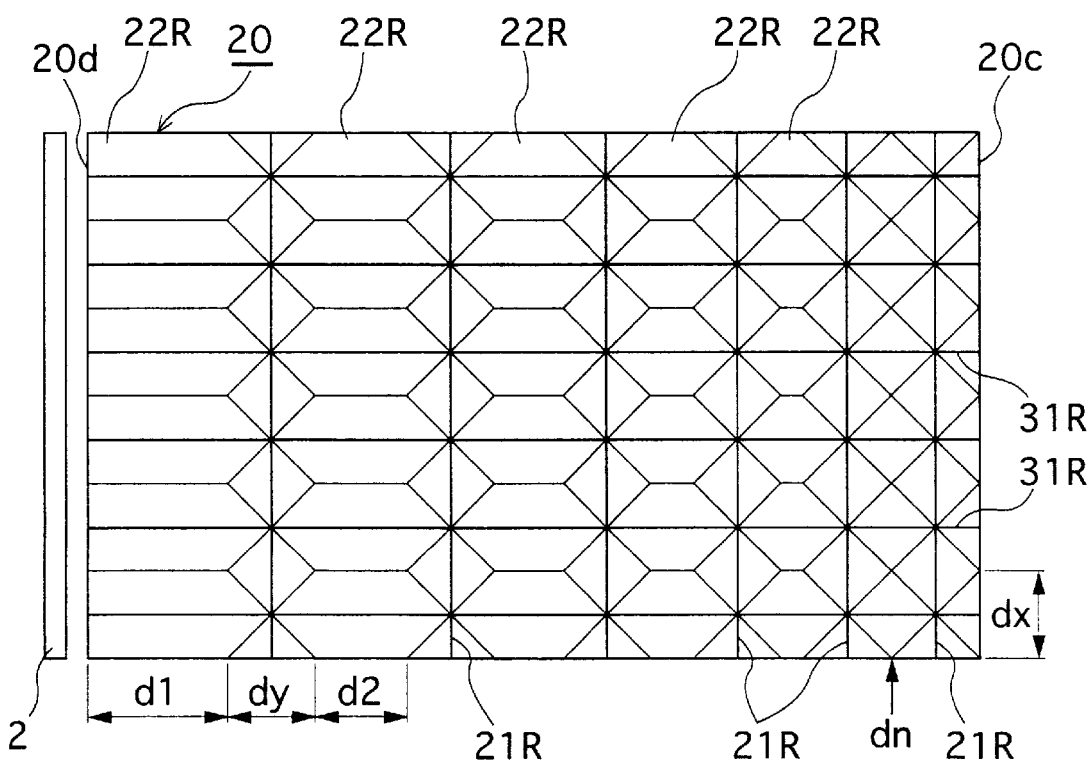
FIG. 20 is a plan view typically showing a backlight apparatus according to a fifth embodiment of the invention.

FIG. 20 typically shows a backlight apparatus according to a fifth embodiment of the invention.

The fifth embodiment is different from the fourth embodiment in the structure of the light emitting surface 20a of the light guide plate 20. Other structures are the same as the fourth embodiment. The light guide plate 20 of the fifth embodiment is made by simply transferring the ragged pattern of the emitting surface 20a of the guide plate 20 of the fourth embodiment on a flat surface. Specifically, the emitting surface 20a is formed integrally with horizontal protrusions 21R which have a convex shape transferring the concave shape of the horizontal grooves 21. The horizontal protrusions 21R are located at a projected position from flat portions 22R. Moreover, the emitting surface 20a is formed integrally with vertical grooves 31R which define a reverse serrated pattern transferring the vertical grooves 31. The arrangements of the horizontal protrusions 21R and the flat portions 22R are the same as the arrangements of the horizontal groove 21 and the flat portions 22.

In the fourth embodiment, convex prisms of substantially pyramid shape and trapezoid cross-section are defined between the adjacent horizontal grooves 21 and vertical grooves 31. Such convex prisms control the outgoing light from the emitting surface 20a. In the fifth embodiment, there are defined concave prisms of substantially pyramid shape and trapezoid cross-section transferring such convex shape. Such concave prisms control the outgoing light from the emitting surface 20a.

Figure 21:
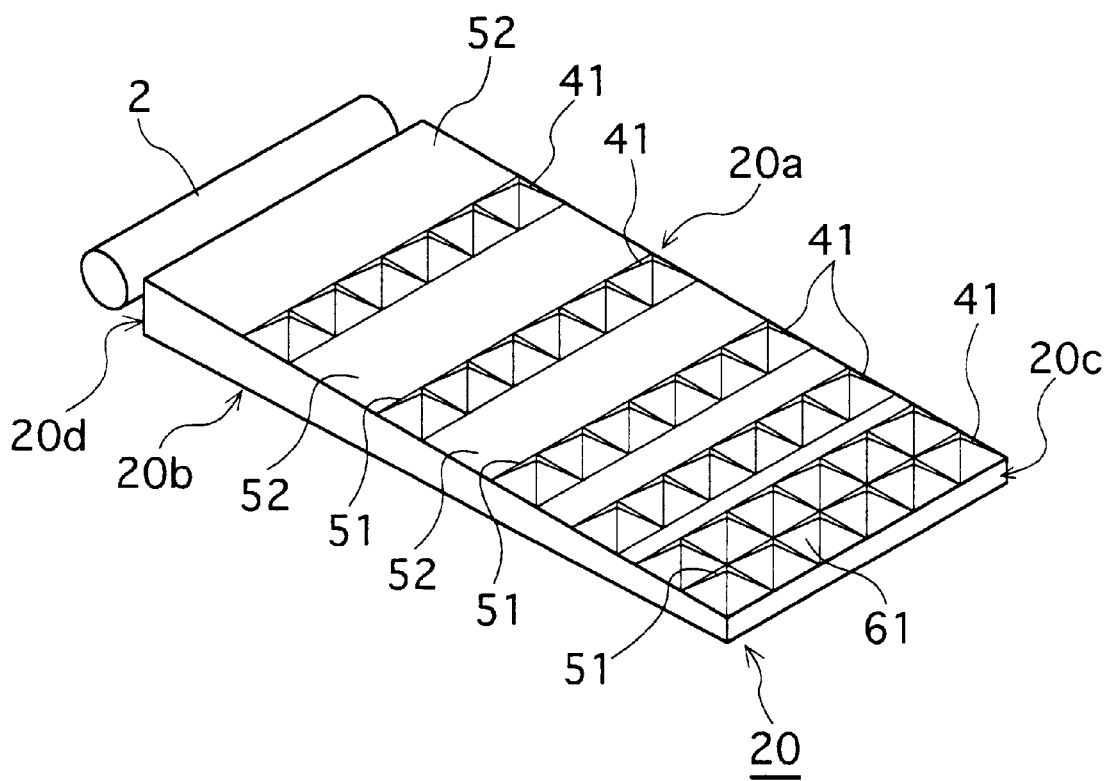
FIG. 21 is a perspective view typically showing a backlight apparatus according to a sixth embodiment of the invention.
Figure 22:
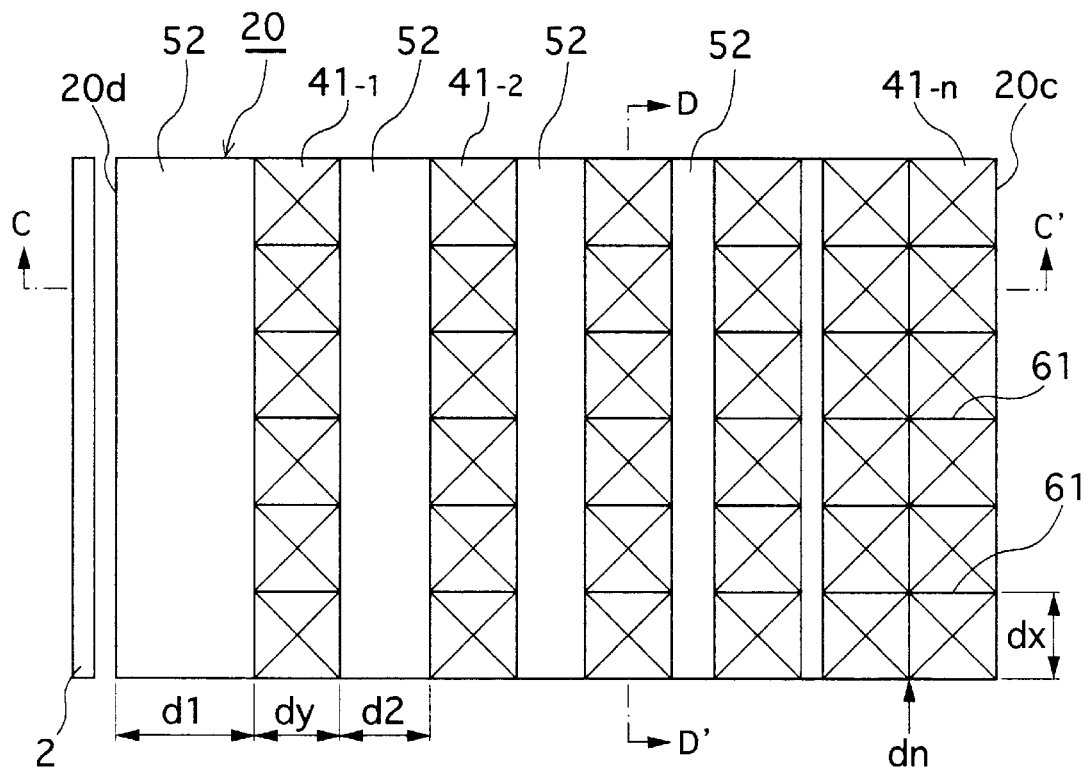
FIG. 22 is a plan view typically showing the sixth embodiment of backlight apparatus.
Figure 23:
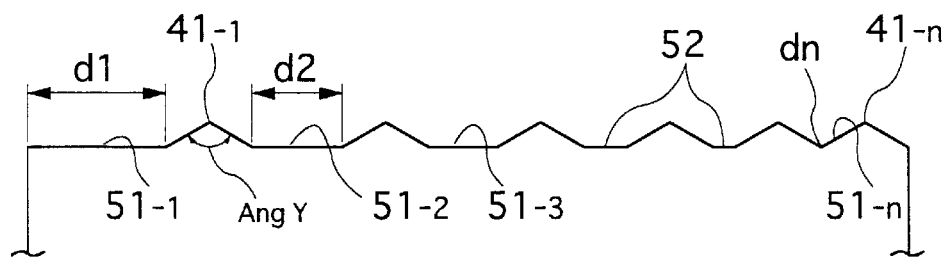
FIG. 23 is a cross-sectional view taken along the line C–C' of FIG. 22.
Figure 24:
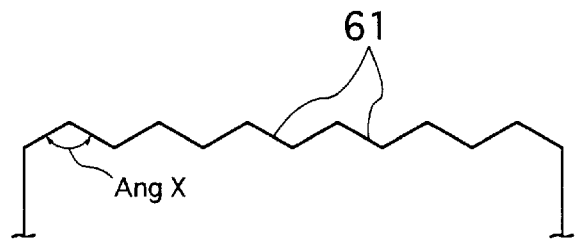
FIG. 24 is a cross-sectional view taken along the line D–D' of FIG. 22.

FIGS. 21 and 22 typically shows a backlight apparatus according to a sixth embodiment of the invention. FIG. 23 is a cross-sectional view taken along the line C–C' of FIG. 22. FIG. 24 is a cross-sectional view taken along the line D–D' of FIG. 22.

The sixth embodiment is different from the fourth embodiment in the structure of the light emitting surface 20a of the light guide plate 20. Other structures are the same as the fourth embodiment. Many pyramid arrays 41 (41-1, 41-2, . . . , 41-n) are provided discontinuously on the emitting surface 20a so as to be parallel to the light source 2. Namely, each pyramid array 41 is made by disposing pyramids of triangular cross-section close and linearly in the width direction of the light guide plate 20. The pyramid arrays 41 are disposed parallel to each other with intervals in the depth direction of the guide plate 20. The interval between the adjacent pyramid arrays 41 is set smaller as goes away from the end 20d. At last, the pyramid arrays 41 are continuously arranged near the end 20c so that the interval therebetween is zero.

Horizontal grooves 51 (51-1, 51-2, . . . , 51-n) are formed between the pyramid arrays. Each groove 51 has substantially reversed trapezoidal cross-section and extends in the width direction of the light guide plate 20. A bottom of the horizontal groove 51 defines a flat portions 52. Namely, the flat portions 51 are formed between the end 20d and the first pyramid array 41 and between the adjacent pyramid arrays 41, respectively. The flat portion 52 has an oblong shape extending in the width direction of the guide plate 20. A width of each flat portion 52 is largest at the thicker end 20d and become smaller gradually as goes toward the thinner end 20c. At last, any flat portion 52 is not formed between the pyramid arrays 41 near the end 20c.

Referring to FIGS. 22 and 23, each pyramid of the pyramid array 41 has a base width of dy=50 $\mu$m and an apex angle of AngY=120°. The first flat portion 52 has a width of d1=0.5 mm. The widths d2–dn of the following flat portions 52 become smaller constantly by a fixed value, as in the flat portions 12 of the first embodiment, as goes away from the light source 2. Near the opposite end 20c, the pyramid arrays 41 are successive so that the width therebetween is dn=0. The position where dn=0 may be a position very near the end 20c or around a position located inward from the end 20c approximately by $\frac{1}{5}$ to $\frac{1}{100}$ of the depth of the guide plate 20.

Moreover, as shown in FIG. 24, many vertical grooves 61 are formed on the emitting surface 20a of the guide plate 20 at right angles to the pyramid arrays 41, horizontal grooves 51 and light source 2. As shown in FIG. 22, each vertical groove 61 is formed between pyramids of each pyramid array 41. In detail, the vertical groove 61 has a triangular cross-section and extend linearly in the depth direction of the guide plate 20. Many vertical grooves 61 are continuously formed so as to be parallel to each other Thus, a serrated or zigzag surface is defined on the emitting surface 20a.

Each vertical groove 61 has a cross-section of isosceles triangle that has a base width of dx=50 $\mu$m and an apex angle of AngX=120°. Such light guide plate 20 is manufactured by injection molding so as to form the pyramid arrays 41 and vertical grooves 61 integrally on the emitting surface 20a.

In the present embodiment, the light is totally reflected at the back surface 20b when propagated inside the light guide plate 20, and advances away from the light source 2, as in the fourth embodiment. On the other hand, the light is refracted at the pyramid arrays 41 and the vertical grooves 61, thereby outgoing from the emitting surface of the guide plate 20. Thus, the outgoing light is uniform all over the emitting surface 20a. Such outgoing light is diffused at the pyramid arrays 41 and vertical grooves 61, and is not oriented in a specific direction.

Moreover, the vertical grooves 61 improves the light output efficiency. If the light source 2 is a discharge lamp or the like which has an uneven light quantity along the length, density of the vertical grooves 61 may be changed in accordance with a position or brightness of the light source 2. Thus, the entire emitting surface 20a can be lit substantially at an even brightness.

Figure 25:
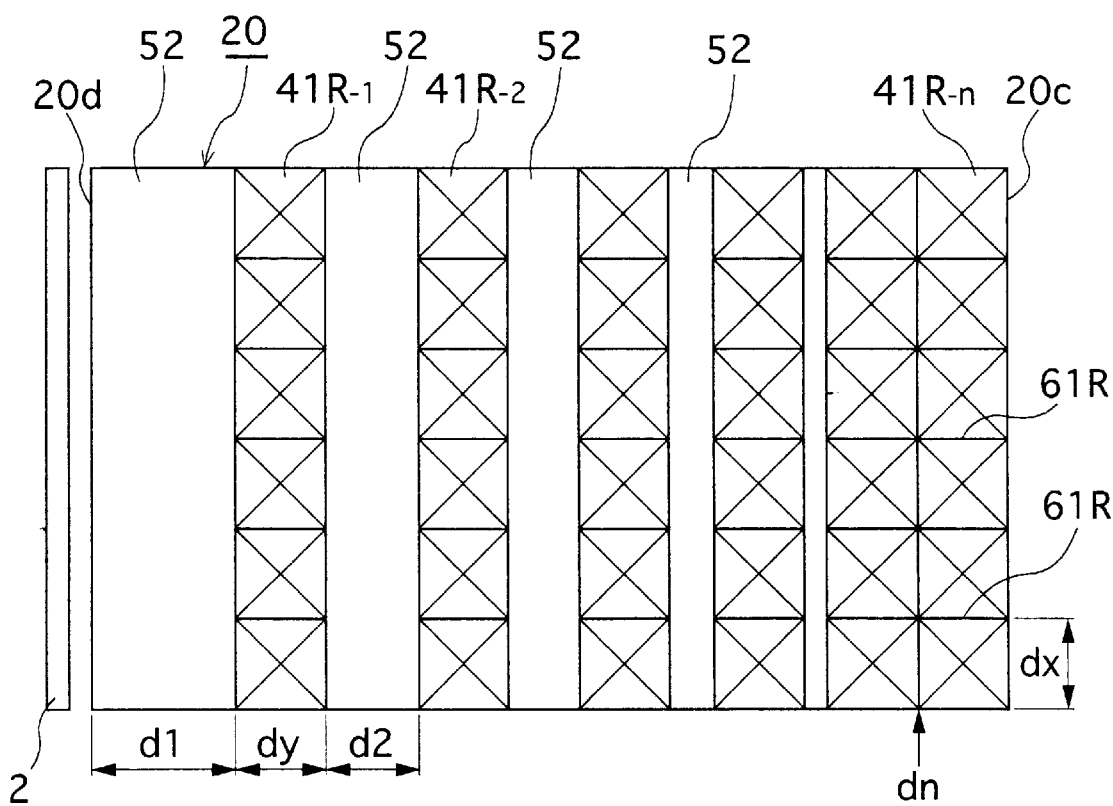
FIG. 25 is a plan view typically showing a backlight apparatus according to a seventh embodiment of the invention.

FIG. 25 typically shows a backlight apparatus according to a seventh embodiment of the invention.

The seventh embodiment is different from the sixth embodiment in the structure of the light emitting surface 20a of the light guide plate 20. Other structures are the same as the sixth embodiment. The light guide plate 20 of the seventh embodiment is made by simply transferring the ragged pattern of the emitting surface 20a of the guide plate 20 of the sixth embodiment on a flat surface. Specifically, the emitting surface 20a is formed integrally with pyramid arrays 41R which have a concave shape transferring the convex shape of the pyramid arrays 41. The pyramid arrays 41R are located at a dented position from the flat portions 52R. Moreover, the emitting surface 20a is formed integrally with vertical protrusions 61R which define a reverse serrated pattern transferring the vertical grooves 61. The arrangements of the pyramid arrays 41R and the flat portions 52R are the same as the arrangements of the pyramid arrays 41 and the flat portions 52.

In the sixth embodiment, each pyramid prism of the pyramid array 41 controls the outgoing light from the emitting surface 20a. In the seventh embodiment, the concave pyramid prism transferring such shape controls the outgoing light from the emitting surface 20a.

According to a simulation by the inventors and so on, the fourth embodiment and sixth embodiment (fifth embodiment and seventh embodiment) basically have a similar characteristic. It can be deemed that there are no substantial difference between them. Consequently, only the characteristic of the fourth embodiment is described hereafter. In the fourth embodiment, a light intensity or irradiance distribution is checked in each cases of changing the apex angle AngX=AngY of the horizontal groove 21 and vertical groove 31, changing the largest width d1 of the flat portion 22, changing the base width dx=dy of the horizontal groove 21 and vertical groove 31, respectively.

Figure 26:
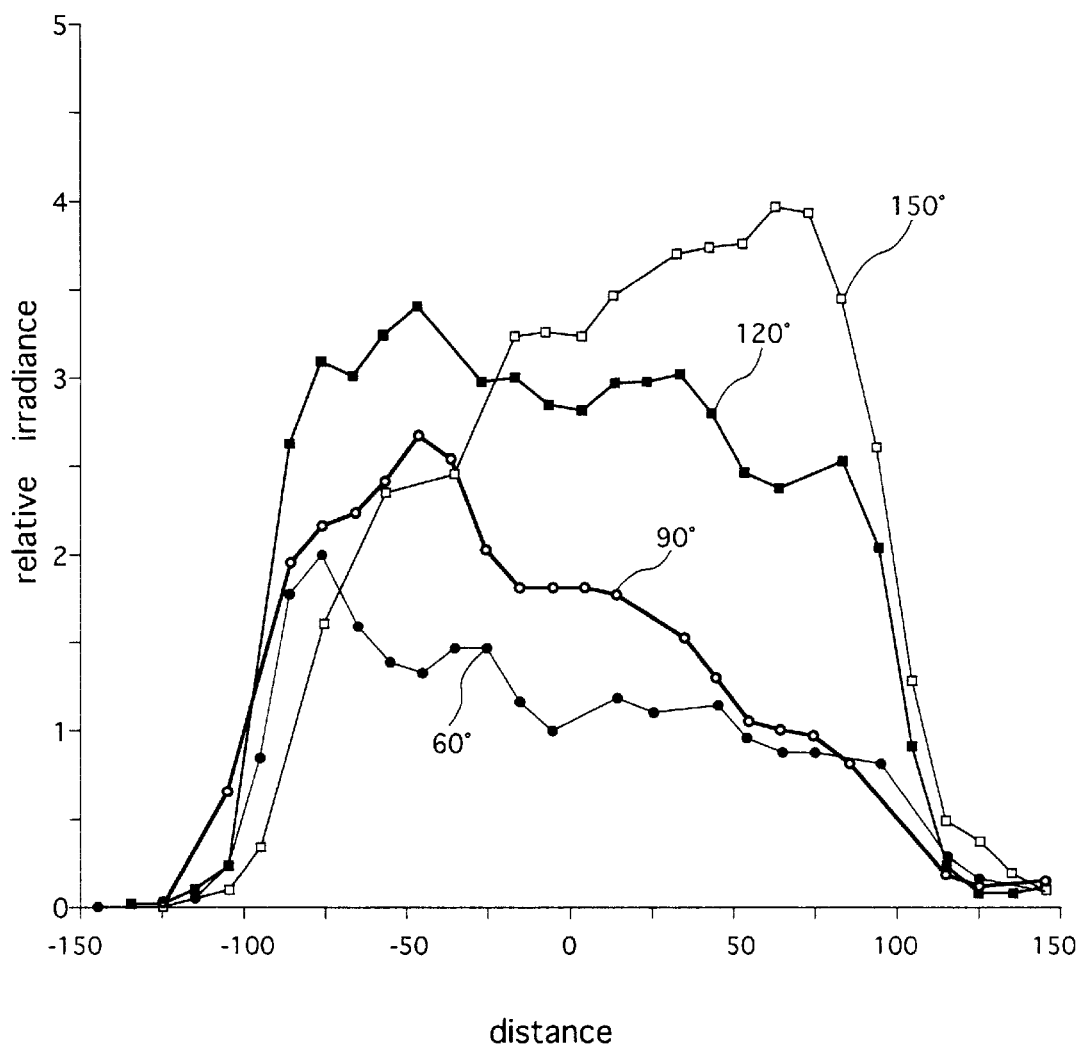
FIG. 26 is a graph showing a relation between a distance from a light source and a relative irradiance in case an apex angle of a horizontal groove of a light guide plate is changed in the fourth embodiment of backlight apparatus.

FIG. 26 shows a relation between a distance from a light source and a relative irradiance in case an apex angle of a horizontal groove of a light guide plate is changed in the fourth embodiment of backlight apparatus.

In the example of FIG. 26, the width of the first flat portion 21 is d1=0.5 mm and the width of the opposite end is dn=0 mm. Moreover, the base width of the triangular cross-section of the horizontal groove 21 or vertical groove 31 is dx=dy=0.05 mm. Then, the apex angle is changed among AngX=AngY=60°, 90°, 120°, 150°. FIG. 26 shows a simulation result for an irradiance in such case.

If both of the apex angle AngY of the horizontal groove 21 and the apex angle AngX of the vertical groove 31 are in the range of 60°, 90°, 120° and 150°, the light intensity at the center of the emitting surface 20a is sufficient and the irradiance distribution is uniform. Thus, the irradiance distribution is largely improved. It is improved even if compared with the first embodiment. Particularly, if the apex angle is nearly 120°, the outgoing light quantity is very much increased. Thus, the improvement is outstanding. For the apex angles AngX=AngY of the horizontal groove 21 and vertical groove 31, it is understood that approximately 60° to 150° is preferable.

Figure 27:
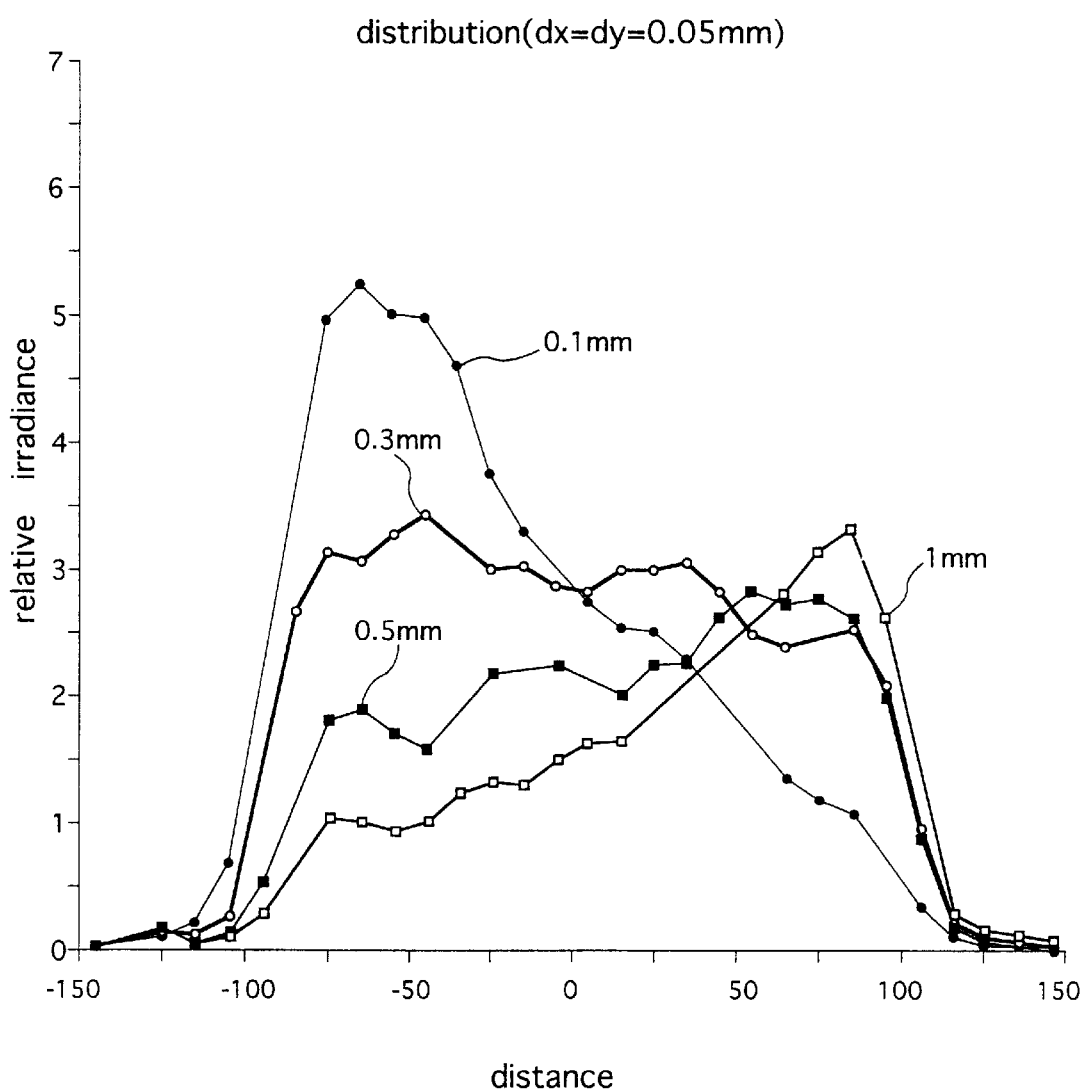
FIG. 27 is a graph showing a relation between a distance from a light source and a relative irradiance in case a width of a first flat portion of a light guide plate is changed in the fourth embodiment of backlight apparatus.

FIG. 27 shows a relation between a distance from a light source and a relative irradiance in case a width of a first flat portion of a light guide plate is changed in the fourth embodiment of backlight apparatus.

In the example of FIG. 27, the width of the first flat portion 21 is changed among d1=0.1, 0.3, 0.5 and 1.0 mm and the width of the opposite end is dn=0 mm. The width d1–dn becomes smaller constantly as goes away from the light source 2 so that the horizontal grooves 21 are continuous at the last end. Moreover, the base width of the triangular cross-section of the horizontal groove 21 or vertical groove 31 is dx=dy=0.05 mm. Furthermore, the apex angle of the horizontal groove 21 or vertical groove 31 is AngX=AngY= 120°. FIG. 27 shows a simulation result for an irradiance in such case.

If the width d1 of the first flat portion 22 is 0.1 mm or 1.0 mm, the irradiance is large at a position near or far from the light source 2 on the emitting surface 20a. However, it is understood that, if the first width d1 is about 0.3 mm or 0.5 mm, the irradiance distribution is most uniform. Thus, the irradiance distribution is largely improved. Accordingly, it is also understood that, if the apex angle AngX=AngY is set at 120° as a preferred value of the horizontal and vertical grooves 21 and 31, approximately 0.4±0.15 mm is preferred for the width d1 of the first flat portion 21. In this case, the width d2–dn of the following flat portions 22 becomes less than approximately 0.4±0.15 mm.

Figure 28:
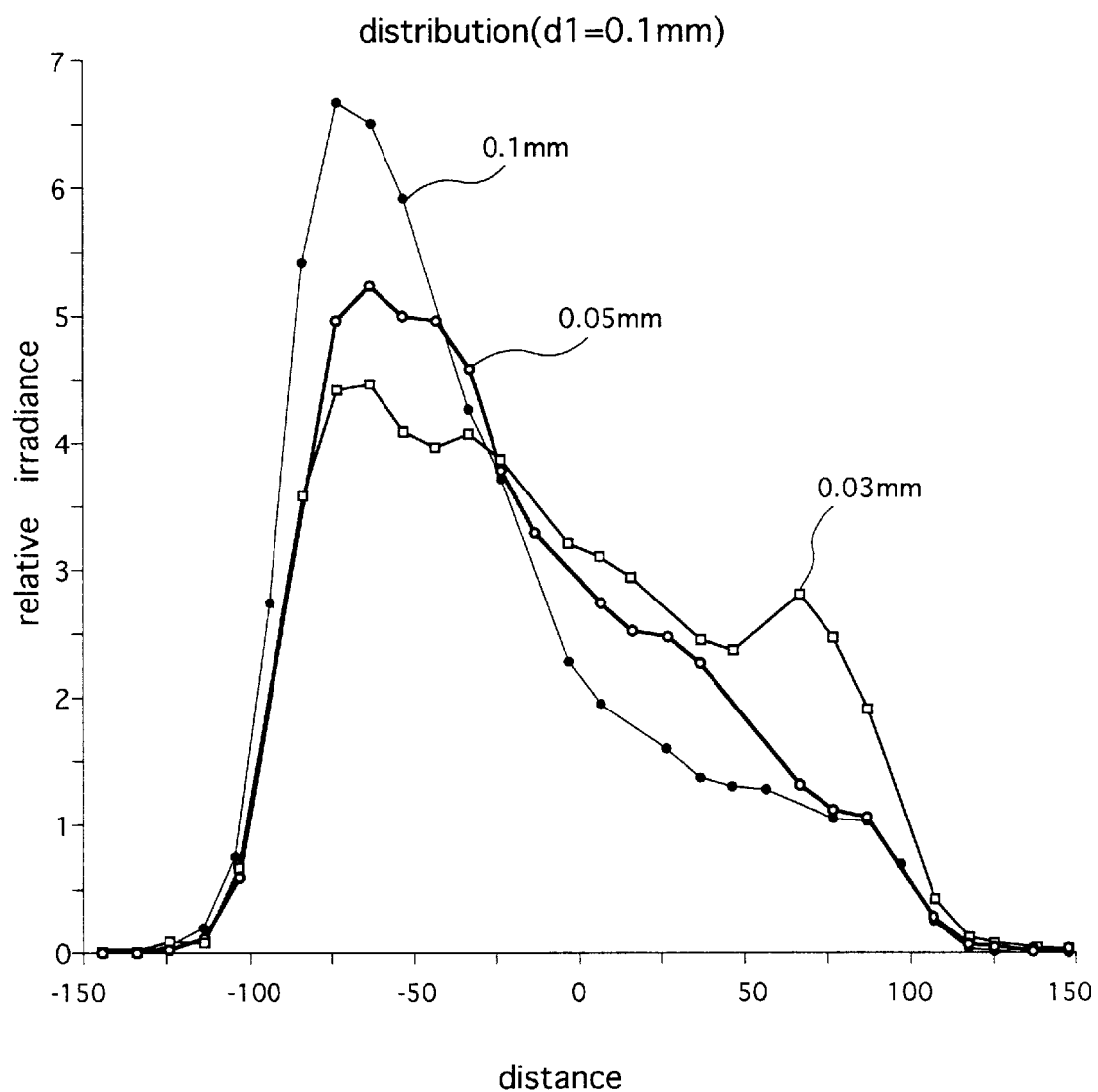
FIG. 28 is a graph showing a relation between a distance from a light source and a relative irradiance in case a base width of a horizontal groove of a light guide plate is changed, while a width of a first flat portion is set at d1=0.1 mm, in the fourth embodiment of backlight apparatus.

FIG. 28 shows a relation between a distance from a light source and a relative irradiance in case a base width of a horizontal groove of a light guide plate is changed, while a width of a first flat portion is set at d1=0.1 mm, in the fourth embodiment of backlight apparatus.

In the example of FIG. 28, the width of the first flat portion 21 is d1=0.1 mm and the width of the opposite end is dn=0 mm. The width d1–dn becomes smaller constantly as goes away from the light source 2 so that the horizontal grooves 21 are continuous at the last end. The apex angle of the horizontal groove 21 or vertical groove 31 is set at AngX=AngY=120° as a preferred value. Moreover, the base width of the triangular cross-section of the horizontal groove 21 or vertical groove 31 is changed among dx=dy=0.03, 0.05, 0.1 mm. FIG. 28 shows a simulation result for an irradiance in such case.

If the base width of the flat portion 22 is 0.05 mm or 0.1 mm, the irradiance is large at a position near the light source 2 on the emitting surface 20a. However, it is understood that, if the base width is about 0.03 mm, the irradiance distribution is good. Accordingly, it is also understood that, if d1=0.1 mm, the irradiance distribution is comparatively uniform and preferable by setting the base width at 0.3 mm or less.

Figure 29:
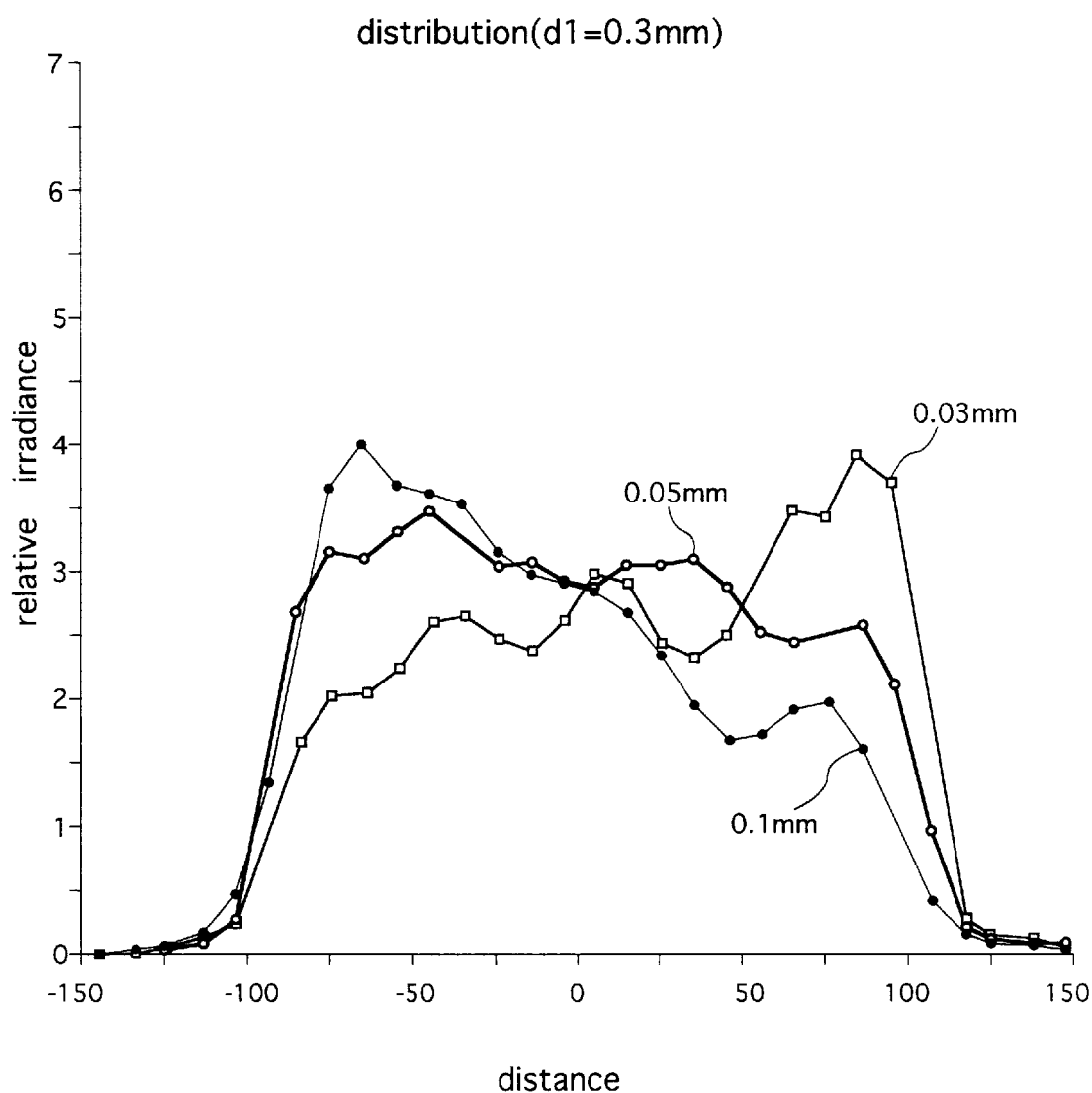
FIG. 29 is a graph showing a relation between a distance from a light source and a relative irradiance in case a base width of a horizontal groove is changed, while a width of a first flat portion is set at d1=0.3 mm, in the fourth embodiment of backlight apparatus.

FIG. 29 shows a relation between a distance from a light source and a relative irradiance in case a base width of a horizontal groove is changed, while a width of a first flat portion is set at d1=0.3 mm, in the fourth embodiment of backlight apparatus.

In the example of FIG. 29, the width of the first flat portion 21 is d1=0.3 mm and the width of the opposite end is dn=0 mm. The width d1–dn becomes smaller constantly as goes away from the light source 2 so that the horizontal grooves 21 are continuous at the last end. The apex angle of the horizontal groove 21 or vertical groove 31 is set at AngX=AngY=120° as a preferred value. Moreover, the base width of the triangular cross-section of the horizontal groove 21 or vertical groove 31 is changed among dx=dy=0.03, 0.05, 0.1 mm. FIG. 29 shows a simulation result for an irradiance in such case.

If the base width of the flat portion 22 is 0.03 mm or 0.1 mm, the irradiance is large at a position near or far from the light source 2 on the emitting surface 20a. Still, the irradiance distribution is largely improved. Particularly, it is understood that, if the base width is about 0.05 mm, the irradiance distribution is most uniform. In a simulation, the inventors and so on confirmed that it is preferable to the base width at nearly 0.01–0.1 mm. In such case, the light intensity is improved and irradiance distribution is substantially uniform.

Figure 30:
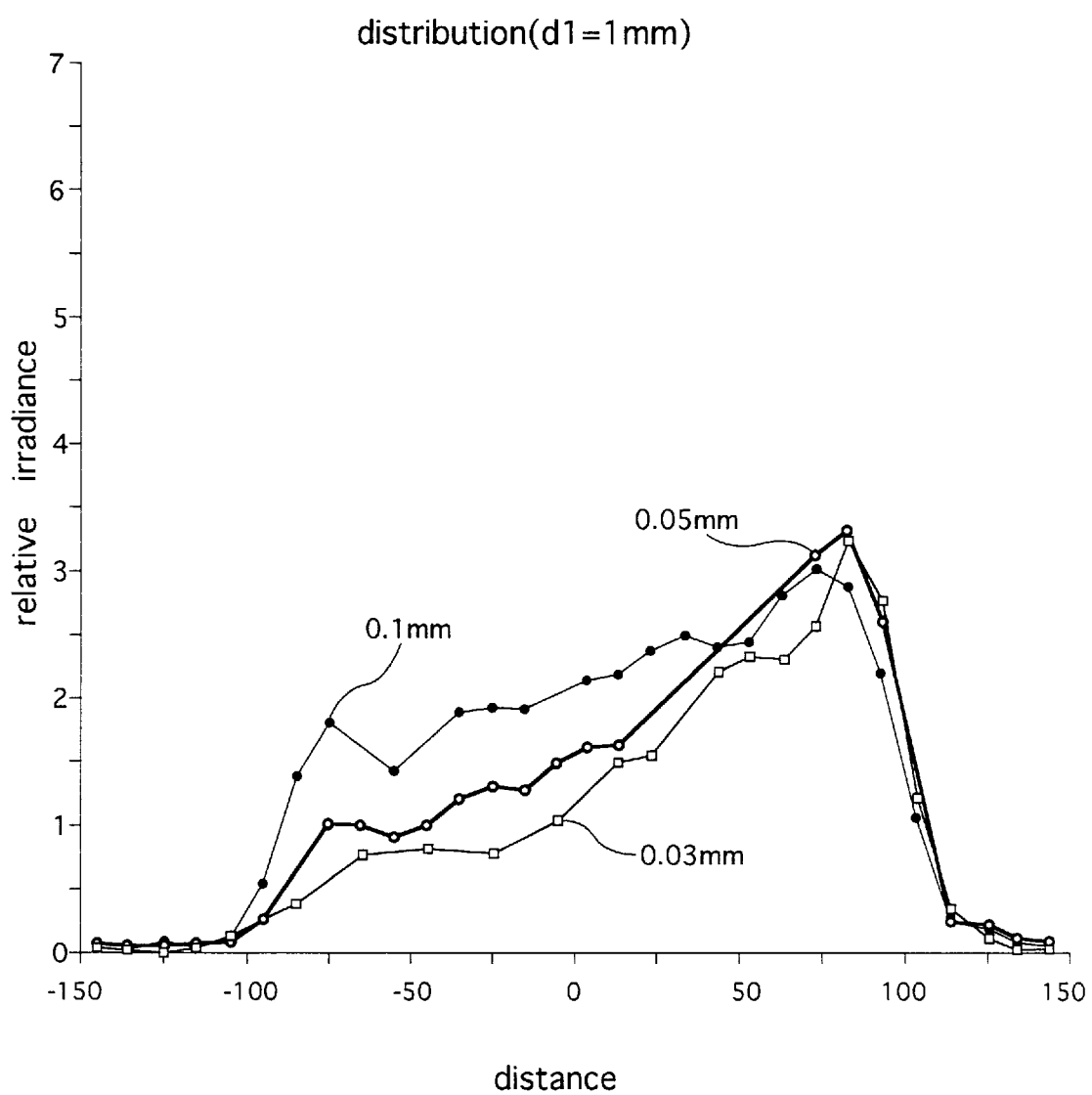
FIG. 30 is a graph showing a relation between a distance from a light source and a relative irradiance in case a base width of a horizontal groove is changed, while a width of a first flat portion is set at d1=1 mm, in the fourth embodiment of backlight apparatus.

FIG. 30 shows a relation between a distance from a light source and a relative irradiance in case a base width of a horizontal groove is changed, while a width of a first flat portion is set at d1=1 mm, in the fourth embodiment of backlight apparatus.

In the example of FIG. 30, the width of the first flat portion 21 is d1=1 mm and the width of the opposite end is dn=0 mm. The width d1–dn becomes smaller constantly as goes away from the light source 2 so that the horizontal grooves 21 are continuous at the last end. The apex angle of the horizontal groove 21 or vertical groove 31 is set at AngX=AngY=120° as a preferred value. Moreover, the base width of the triangular cross-section of the horizontal groove 21 or vertical groove 31 is changed among dx=dy=0.03, 0.05, 0.1 mm. FIG. 30 shows a simulation result for an irradiance in such case.

If the base width of the flat portion 22 is 0.03 mm or 0.05 mm, the irradiance is large at a position far from the light source 2 on the emitting surface 20a. However, it is understood that, if the base width is about 0.1 mm, the irradiance distribution is comparatively uniform. Accordingly, it is obvious that, if the width of the first flat portion is d1=1 mm, the inventive apparatus is practicable by setting the base width at dx=dy=0.1 mm.

In view of the results from FIGS. 26 to 30, the preferred values are such that the width of the first flat portion 22 is d1=0.4±0.15 mm, while the opposite end width being dn=0. Moreover, it is preferred to set the apex angle AngX=AngY=60°–150°, while setting the base width of the triangular cross-section nearly at dx=dy=0.01–0.1 mm, for the horizontal and vertical grooves 21 and 31. In this case, it is understood that the irradiance distribution is uniform and preferable.

As mentioned above, there are two cases as a grooved or ragged pattern formed on the emitting surface 20a of the light guide plate 20. The first one is to make the width of the groove 21 even, while adjusting the width of the prism of trapezoidal cross-section defined between the grooves 21 (width of the flat portion 22 on the prism) as shown in the fourth embodiment. The second one is contrary to the first one, i.e. to make the width of the prism 41 even, while adjusting the width of the groove 51 between the prisms 41 (width of the flat portion 52 between the prisms) as shown in the sixth embodiment.

In the fourth to seventh embodiments, uniform irradiance or luminance is obtained on the light emitting surface 20a by appropriately setting and adjusting the width d1–dn of the flat portion 22, 51 as well as the horizontal groove 21 or horizontal protrusion 21R or pyramid array 41, 41R. Moreover, the vertical grooves 31, 31R, 61, 61R makes uniform the brightness along the length of the light source 2. Therefore, even if the light source 2 is a discharge lamp or the like whose light quantity is uneven along the length, the entire emitting surface 20a can be lit at substantially uniform brightness due to diffusing effects of the vertical grooves 31, 31R, 61, 61R. Particularly, since the vertical grooves 31, 31R, 61, 61R are continuously and repeatedly formed at the constant pitch so as to define the serrated surface, the light output efficiency is heightened more. The cross-section of each groove forming the vertical grooves 31, 31R, 61, 61R may be another shape than the above, e.g. a desired polygon, embossed shape and the like.

According to the fourth to seventh embodiments, the light guide plate 20 has the following advantageous effects. It can be formed by injection molding and its manufacturing is easy. The outgoing light from the emitting surface 20a is uniform and has excellent directivity. Moreover, it is low-priced.

While, in the fourth to seventh embodiments, the cross-section of the horizontal groove 21 or horizontal protrusion 21R or each pyramid of the pyramid array is substantially the isosceles triangle, it is not limited to such isosceles triangle in the invention. This is because the horizontal groove 21 and the like do not have particularly large dimension relative to the thickness of the light guide plate 20, namely it is micron order. The cross-section of the horizontal groove 21 or horizontal protrusion 21R or each pyramid of the pyramid array may be a triangle such as a scalene triangle or a right-angled triangle other than the isosceles triangle. Otherwise, another shape than the triangle may be adopted such as a trapezoid, semi-circle, semi-ellipse. However, if the cross-section is the isosceles triangle, it is possible to guide the reflected light coming from other positions than the light source 2 toward the emitting surface 20a. Moreover, the die releasing is easy in injection molding. This is the same with respect to the vertical grooves 31, 31R, 61, 61R. If the cross-section is trapezoidal, the prism formed between the horizontal grooves 21 and vertical grooves 31 is substantially a truncated pyramid shape.

Particularly, the inventors and so on confirmed that it is preferable to practice the invention while setting the apex angle of the isosceles triangle of the horizontal groove 21 in the range of 60° to 150°. The inventors and so on also confirmed that the invention can be embodied for an LCD for personal computers by setting the base width of the isosceles triangle in the range of 0.01–0.1 mm.

Moreover, if the cross-section of the vertical grooves 31, 31R, 61, 61R is substantially the isosceles triangle while setting the apex angle in the range of 60° to 150°, the inventive apparatus has a directivity preferable for the LCD while heightening the light output efficiency.

The fourth to seventh embodiments may have another structure than the above mentioned, as long as they have grooves on the emitting surface 20a of the light guide plate 20, while increasing the number of the grooves as goes away from the light source 2. In this case, it is possible to heighten the light output efficiency from the emitting surface 20a as goes away from the light source, if the number of the grooves increases as goes away from the light source 2. Therefore, the light emission is restrained at a position near the light source 2, so that the light can be guided to the opposite end of the light guide plate 20. Thus, the irradiance distribution on the emitting surface 20a can be uniform. Moreover, contrary to the case in which one kind of grooves is provided, two kinds of grooves such as the horizontal grooves 21 and the vertical grooves 31 are crossed to each other in the fourth to seventh embodiments. Then, the light output efficiency can be set as desired in accordance with the incident light distribution from the light source 2 by adjusting the distribution or density of the two kinds of grooves.

The vertical grooves extending in the light incidence direction lift up the light escaping in the horizontal direction (width direction of the light guide plate 20) from the emitting surface 20a. Thus, such light goes out from the emitting surface 20a in the perpendicular direction (thickness direction of the light guide plate 20). Therefore, the directivity is improved. Moreover, the incident light is guided up to the last end of the light guide plate 20 by the arrangement of the horizontal grooves, horizontal protrusions or pyramid arrays which are perpendicular to the light incidence direction. Therefore, the luminance or irradiance distribution becomes uniform.

If the groove of the light guide plate 20 has substantially a triangular or trapezoidal cross-section, it is possible to guide the light coming from other positions than the light source 2 toward emitting surface 20a. Moreover, if the triangle of the cross-section is isosceles, outstanding advantageous effects are obtained in improving the light intensity and making the irradiance distribution uniform. In the apparatus which has the reflecting film 25 formed on the back surface 20b of the light guide plate 20, outstanding advantageous effects are obtained in improving the light intensity and making the irradiance distribution uniform, too.

It is possible to make uniform the brightness in the length direction of the light source 2 by changing the density of the vertical grooves or protrusions 31, 31R, 61, 61R of the light guide plate 20 in accordance with the intensity distribution of the incident light. Therefore, even if the light source 2 is a discharge lamp or the like which has an uneven light quantity along the length, the density of the vertical grooves or protrusions 31, 31R, 61, 61R can be changed in accordance with a position or brightness of the light source 2. Thus, the entire emitting surface 20a can be lit substantially at an even brightness. In this case, the density may be changed by disposing the grooves or protrusions 31, 31R, 61, 61R discontinuously as in the horizontal grooves or protrusions 21, 21R, namely by providing flat portions between some grooves or protrusions 31, 31R, 61, 61R.

The fourth to seventh embodiments may have another structure, as long as the emitting surface 20a is formed with the grooves the number of which increases as goes away from the light source 2. In this case, the grooves may be constituted by first grooves extending in the incident direction of the light from the light source 2 and second grooves substantially perpendicular to the first grooves. The first grooves correspond to the vertical grooves 31, vertical grooves 31R, vertical grooves 61 or vertical protrusions 61R. The second correspond to the horizontal grooves 21, horizontal protrusions 21R, horizontal grooves 51 between the prism arrays 41, or prism arrays 41R.

Otherwise, if the light source 2 is linear, the grooves may be constituted by first grooves extending parallel to the length direction of the light source 2 and second grooves substantially perpendicular to the first grooves. The first grooves correspond to the horizontal grooves 21, horizontal protrusions 21R, horizontal grooves 51 between the prism arrays 41, or prism arrays 41R. The second correspond to the vertical grooves 31, vertical grooves 31R, vertical grooves 61 or vertical protrusions 61R.

In either case, it is possible to change the density of the grooves according to the intensity distribution of the incident light.

FIG. 31 typically shows an eighth embodiment of backlight apparatus of the invention.

The eighth embodiment of backlight apparatus has a light guide plate 70. The light guide plate 70 has a shape obtained by joining two wedge type plates of the aforementioned embodiments together at the thinner ends. Namely, the light guide plate 70 has a flat front surface defined by two light emitting surfaces 70a. Each light emitting surface 70a corresponds to the light emitting surface 10a, 20a of the aforementioned embodiments. The light guide plate 70 has two back surfaces 70b, too, each of which corresponds to the back surface 10b, 20b of the aforementioned embodiments. The light guide plate 70 also has two thicker ends 70d defining incident surfaces, each of which corresponds to the thicker end 10d, 20d of the aforementioned embodiments. The backlight apparatus has two light sources 2 disposed in a faced manner to the thicker ends 70d, respectively. Of course, no thinner end is defined on Ad the light guide plate 70. Instead, the light guide plate 70 is thinner at the center in the incident direction of the light from the light source 2.

Such shape of light guide plate 70 is provided with discontinuous horizontal grooves or protrusions on the back surface 70b, in the same manner as the first to third embodiments. Otherwise, the light guide plate 70 is provided with discontinuous horizontal grooves or protrusions as well as the vertical grooves or protrusions, in the same manner as the fourth to seventh embodiments.

In the first case, the light guide plate 70 has irregularities 71 formed on each back surface 70b. The irregularities 71 are composed of the horizontal grooves 11 of the first embodiment or the prisms 17 of the third embodiment. In this case, the zigzag surface 13 of the second embodiment may be provided on each emitting surface 70a.

In the second case, the light guide plate 70 has irregularities 73 formed on each emitting surface 70a. The irregularities 73 are composed of the horizontal grooves 21 and vertical grooves 31 of the fourth embodiment, the horizontal protrusions 21R and vertical grooves 31R of the fifth embodiment, the pyramid arrays 41 of the sixth embodiment or the pyramid arrays 41R of the seventh embodiment. In either case, the reflecting layer 15, 25 may be formed on the back surface 70b.

FIG. 32 typically shows a ninth embodiment of backlight apparatus of the invention.

The ninth embodiment of backlight apparatus has a light guide plate 80. The light guide plate 80 is a wedge type plate of the aforementioned embodiments. Thus, the light guide plate 80 has a flat front surface defining a light emitting surface 80a, which corresponds to the light emitting surface 10a, 20a of the aforementioned embodiments. The light guide plate 80 has a back surface 80b, too, which corresponds to the back surface 10b, 20b of the aforementioned embodiments. The light guide plate 80 also has a thinner end 80c which corresponds to the thinner end 10c, 20c of the aforementioned embodiments. The light guide plate 80 also has a thicker end 80d defining an incident surface, which corresponds to the thicker end 10d, 20d of the aforementioned embodiments. While the backlight apparatus of the aforementioned embodiments has the line light source 2, the present embodiment of backlight apparatus has a point light source 5. The light source 5 is disposed at the longitudinal center of the thicker end 80d in a faced manner.

Such light guide plate 80 is provided with discontinuous parallel grooves or protrusions on the back surface 80b, in the same manner as the first to third embodiments, except their shape or pattern in plan view. Otherwise, the light guide plate 80 is provided with discontinuous horizontal grooves or protrusions as well as the vertical grooves or protrusions, in the same manner as the fourth to seventh embodiments, except their shape or pattern in plan view.

In the first case, the light guide plate 80 has irregularities 81 formed on the back surface 80b. The irregularities 81 are made by curving the horizontal grooves 11 or prisms 17 of the first or third embodiment such that they extend in a circular manner concentrically about the point light source 5 as their center. Thus, each irregularity 81 has the same cross-section and dimension as the horizontal groove 11 or prism 17. Moreover, the irregularities 81 are arranged at the same intervals as in the first or third embodiment, while decreasing the intervals constantly as goes away from the light source 5. In this case, the emitting surface 80a may be provided with irregularities extending perpendicular to the irregularities 81 on the back surface 80b. Each of such irregularities has a cross-section similar to that of the zigzag surface 13 of the second embodiment.

In the second case, the light guide plate 80 has irregularities 83 formed on the emitting surface 80a. The irregularities 83 are made by curving the horizontal grooves 21, horizontal protrusions 21R or pyramid arrays 41, 41R in the fourth to seventh embodiment such that they extend in a circular direction concentrically about the point light source 5 as their center. Thus, each irregularity 83 has the same cross-section and dimension as the horizontal groove 21, protrusion 21R or pyramid 41, 41R. Moreover, the irregularities 83 are arranged at the same intervals as in the fourth to seventh embodiments, while decreasing the intervals constantly as goes away from the light source 5.

Moreover, another irregularities may be formed on the emitting surface 80a, which extend perpendicular to the irregularities 83, namely, radially from the point light source 2 as the center. Such another irregularities correspond to the vertical grooves 61 or protrusion 61R of the fourth to seventh embodiment.

While each above embodiment is concretized into a backlight apparatus, the invention may be embodied into a light guide plate in itself.

Each above embodiment provides the light guide plate 20 which can eliminate the printing step on the back surface and make outgoing light uniform. However, the light guide plate can be combined with a diffusion film, lens film or the like to construct a backlight apparatus with higher quality, as a matter of course.

The light source of the invention is not limited to the line light source. It may be a common point light source or another point light source composed of plural LEDs or the like. The light source 2 may be a thin tube fluorescent lamp, or a light emitting source which emits light one-dimensionally or two-dimensionally.

The preferred embodiments described herein are therefore illustrative and not restrictive, the scope of the invention being indicated by the appended claims and all variations which come within the meaning of the claims are intended to be embraced therein.

What is claimed is:

1. A backlight apparatus, comprising:
a light source disposed along a specific direction: and
a light guide plate having an incident surface receiving light from the light source, a front surface crossing at right angles to the incident surface and a back surface opposed to the front surface:
the front surface of the light guide plate defining a light emitting surface which emits the light entering the incident surface; and
the light guide plate having horizontal grooves or horizontal protrusions parallel to the specific direction, on the back surface, while decreasing an interval between the horizontal grooves or horizontal protrusions as goes away from the light source;
in which the light guide plate has the horizontal grooves provided on the back surface; and an interval between the incident surface and the first horizontal groove is set at approximately 0.5 mm.

2. A backlight apparatus, comprising:
a light source disposed along a specific direction: and
a light guide plate having an incident surface receiving light from the light source, a front surface crossing at right angles to the incident surface and a back surface opposed to the front surface:
the front surface of the light guide plate defining a light emitting surface which emits the light entering the incident surface; and
the light guide plate having horizontal grooves or horizontal protrusions parallel to the specific direction, on the back surface, while decreasing an interval between the horizontal grooves or horizontal protrusions as goes away from the light source;
in which the light guide plate has the horizontal grooves provided on the back surface; the horizontal groove has a cross-section of a triangle; the triangle is an isosceles triangle; and the isosceles triangle has a base width in the range of 0.02 mm to 0.1 mm.

3. A backlight apparatus, comprising:
a light source disposed along a specific direction: and
a light guide plate having an incident surface receiving light from the light source, a front surface crossing at right angles to the incident surface and aback surface opposed to the front surface:
the front surface of the light guide plate defining a light emitting surface which emits the light entering the incident surface; and
the light guide plate having horizontal grooves or horizontal protrusions parallel to the specific direction, on the back surface, while decreasing an interval between the horizontal grooves or horizontal protrusions as goes away from the light source;
in which the light guide plate has the horizontal grooves provided on the back surface; the horizontal groove has a cross-section of a triangle; the triangle is an isosceles triangle; and the isosceles triangle has an apex angle of approximately 150 degrees.

4. A backlight apparatus, comprising:
a light source disposed along a specific direction: and
a light guide plate having an incident surface receiving light from the light source, a front surface crossing at right angles to the incident surface and aback surface opposed to the front surface:
the front surface of the light guide plate defining a light emitting surface which emits the light entering the incident surface; and
the light guide plate having horizontal grooves or horizontal protrusions parallel to the specific direction, on the back surface, while decreasing an interval between the horizontal grooves or horizontal protrusions as goes away from the light source;
in which the light guide plate has the horizontal grooves provided on the back surface; the horizontal groove has a cross-section of a triangle; the triangle is an isosceles triangle; and the isosceles triangle has an apex angle in the range of 30 degrees to 170 degrees and a base width in the range of 0.02 mm to 0.1 mm.

5. A backlight apparatus, comprising:
a light source disposed along a specific direction: and
a light guide plate having an incident surface receiving light from the light source, a front surface crossing at right angles to the incident surface and a back surface opposed to the front surface:
the front surface of the light guide plate defining a light emitting surface which emits the light entering the incident surface; and
the light guide plate having horizontal grooves or horizontal protrusions parallel to the specific direction, on the back surface, while decreasing an interval between the horizontal grooves or horizontal protrusions as goes away from the light source;
in which the light guide plate has the horizontal grooves provided on the back surface; the horizontal groove has a cross-section of a triangle; the triangle is an isosceles triangle; and the vertical groove has a cross-section of an isosceles triangle having an apex angle in the range of 90 degrees to 170 degrees.

6. A backlight apparatus comprising:
a light source disposed along a specific direction: and
a light guide plate having an incident surface receiving light from the light source, a front surface crossing at right angles to the incident surface and a back surface opposed to the front surface:
the front surface of the light guide plate defining a light emitting surface which emits the light entering the incident surface;
the light guide plate having horizontal grooves or horizontal protrusions parallel to the specific direction, on the light emitting surface, while decreasing an interval between the horizontal grooves or horizontal protrusions as goes away from the light source; and
the light guide plate having vertical grooves, on the light emitting surface, at right angles to the specific direction, the vertical grooves extending parallel to each other.

7. A backlight apparatus as recited in claim 6, in which the light guide plate further has a reflecting film formed on the back surface.

8. A backlight apparatus as recited in claim 6, in which the light guide plate changes a density of the vertical grooves in accordance with a brightness distribution of the light source in the specific direction.

9. A backlight apparatus comprising:

a light source disposed along a specific direction: and a light guide plate having an incident surface receiving light from the light source, a front surface crossing at right angles to the incident surface and a back surface opposed to the front surface:

the front surface of the light guide plate defining a light emitting surface which emits the light entering the incident surface;

the light guide plate having horizontal grooves or horizontal protrusions parallel to the specific direction, on the light emitting surface, while decreasing an interval between the horizontal grooves or horizontal protrusions as goes away from the light source; and the light guide plate having vertical grooves, on the light emitting surface, at right angles to the specific direction, the vertical grooves extending parallel to each other;

in which the light guide plate has the horizontal grooves provided on the light emitting surface: each of the horizontal groove and the vertical groove has a cross-section of substantially a triangle or a trapezoid, thereby defining a prism of substantially a pyramid shape of truncated pyramid shape between the horizontal grooves and the vertical grooves: and the prism increases a length as goes away from the light source.

10. A backlight apparatus as recited in claim 9, in which a flat portion is defined between the horizontal grooves, a width of the flat portion being approximately 0.4±0.15 mm or less.

11. A backlight apparatus as recited in claim 9, in which each of the horizontal groove and the vertical groove has a cross-section of substantially an isosceles triangle.

12. A backlight apparatus as recited in claim 11, in which the isosceles triangle has an apex angle in the range of 60 degrees to 150 degrees.

13. A backlight apparatus as recited in claim 11, in which the isosceles triangle has a base width in the range of 0.01 mm to 0.1 mm.

14. A backlight apparatus as recited in claim 11, in which the isosceles triangle has an apex angle in the range of 60 degrees to 150 degrees and a base width in the range of 0.01 mm to 0.1 mm.

15. A backlight apparatus comprising:

a light source disposed along a specific direction: and a light guide plate having an incident surface receiving light from the light source, a front surface crossing at right angles to the incident surface and a back surface opposed to the front surface:

the front surface of the light guide plate defining a light emitting surface which emits the light entering the incident surface; and the light guide plate having pyramid arrays parallel to each other, on the light emitting surface, the pyramid array being formed by disposing protruded or dented pyramids in the specific direction while decreasing an interval between the pyramid arrays as goes away from the light source.

16. A backlight apparatus as recited in claim 15, in which flat portions are defined between the pyramid arrays, a width of the flat portion being approximately 0.4±0.15 mm or less.

17. A backlight apparatus as recited in claim 15, in which the pyramid has a cross-section of substantially an isosceles triangle.

18. A backlight apparatus as recited in claim 17, in which the isosceles triangle has an apex angle in the range of 60 degrees to 150 degrees.

19. A backlight apparatus as recited in claim 15, in which the light guide plate further has a reflecting film formed on the back surface.

20. A backlight apparatus as recited in claim 15, in which the pyramids have a density changed in accordance with a brightness distribution of the light source in the specific direction.

21. A backlight apparatus, comprising:

a light source disposed along a specific direction: and a light guide plate having an incident surface receiving light from the light source, a front surface crossing at right angles to the incident surface and a back surface opposed to the front surface:

the front surface of the light guide plate defining a light emitting surface which emits the light entering the incident surface; and the light guide plate having pyramid arrays parallel to each other, on the light emitting surface, the pyramid array being formed by disposing protruded or dented pyramids in the specific direction while decreasing an interval between the pyramid arrays as goes away from the light source;

in which the pyramid has a cross-section of substantially an isosceles triangle; and the isosceles triangle has a base width in the range of 0.01 mm to 0.1 mm.

22. A backlight apparatus, comprising:

a light source disposed along a specific direction: and a light guide plate having an incident surface receiving light from the light source, a front surface crossing at right angles to the incident surface and a back surface opposed to the front surface:

the front surface of the light guide plate defining a light emitting surface which emits the light entering the incident surface; and the light guide plate having pyramid arrays parallel to each other, on the light emitting surface, the pyramid array being formed by disposing protruded or dented pyramids in the specific direction while decreasing an interval between the pyramid arrays as goes away from the light source;

in which the pyramid has a cross-section of substantially an isosceles triangle; and the isosceles triangle has an apex angle in the range of 60 degrees to 150 degrees and a base width in the range of 0.01 mm to 0.1 mm.

23. A light guide plate comprising:

an incident surface receiving light from a light source;

a front surface crossing at right angles to the incident surface and defining a light emitting surface which emits the light entering the incident surface;

a back surface opposed to the front surface: and grooves formed on the light emitting surface so as to cross with each other, while increasing a number thereof as goes away from the light source.

24. A light guide plate as recited in claim 23, in which the grooves comprise first grooves extending in an incident direction of the light from the light source and second grooves disposed substantially at right angles to the first grooves.

25. A light guide plate as recited in claim 23, in which the grooves comprise first grooves extending in a longitudinal direction of a line light source and second grooves disposed substantially at right angles to the first grooves.

26. A light guide plate as recited in claim 23, in which the grooves have a cross-section of substantially a triangle or a trapezoid.

27. A light guide plate as recited in claim 23, in which the grooves have a cross-section of substantially an isosceles triangle.

28. A light guide plate as recited in claim 23, further comprising a reflecting film formed on the back surface.

29. A light guide plate as recited in claim 23, in which a density of the grooves is changed in accordance with an intensity distribution of an incident light.

30. A backlight apparatus comprising:
    a light guide plate having an incident surface, a front surface crossing at right angles to the incident surface and defining a light emitting surface which emits the light entering the incident surface, and a back surface opposed to the front surface; and
    a point light source disposed opposite to a longitudinal center of the incident surface of the light guide plate;
    the light guide plate having grooves formed on the back surface so as to extend in a curved manner concentrically about the point light source as a center, the grooves increasing a number thereof as goes away from the point light source.

31. A backlight apparatus comprising:
    a light guide plate having an incident surface, a front surface crossing at right angles to the incident surface and defining a light emitting surface which emits the light entering the incident surface, and a back surface opposed to the front surface; and
    a point light source disposed opposite to a longitudinal center of the incident surface of the light guide plate;
    the light guide plate having grooves formed on the light emitting surface so as to extend in a curved manner concentrically about the point light source as a center, the grooves increasing a number thereof as goes away from the point light source.

* * * * *

UNITED STATES PATENT AND TRADEMARK OFFICE
CERTIFICATE OF CORRECTION

PATENT NO. : 6,123,431

DATED : September 26, 2000

INVENTOR(S) : Yasuko Teragaki, et al

It is certified that error appears in the above-identified patent and that said Letters Patent is hereby corrected as shown below:

Column 3, line 62 and 63 delete "embodiment the invention" and insert ------ embodiment of the invention ----.
Column 17, line 44 delete "defined on Ad the light guide" and insert ---- defined on the light guide -----.

Signed and Sealed this

Twenty-ninth Day of May, 2001

Attest:

NICHOLAS P. GODICI

*Attesting Officer*  *Acting Director of the United States Patent and Trademark Office*